US012623612B2

(12) United States Patent
Iverson

(10) Patent No.: US 12,623,612 B2
(45) Date of Patent: May 12, 2026

(54) WINDSHIELD MOUNT FOR PERSONAL ELECTRONIC DEVICE

(71) Applicant: MacNeil IP LLC, Bolingbrook, IL (US)

(72) Inventor: David S. Iverson, Oak Brook, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 653 days.

(21) Appl. No.: 17/895,779

(22) Filed: Aug. 25, 2022

(65) Prior Publication Data

US 2024/0067102 A1     Feb. 29, 2024

(51) Int. Cl.
*B60R 11/02* (2006.01)
*B60R 11/00* (2006.01)

(52) U.S. Cl.
CPC ... *B60R 11/0241* (2013.01); *B60R 2011/0026* (2013.01); *B60R 2011/0056* (2013.01); *B60R 2011/0075* (2013.01); *B60R 2011/0078* (2013.01); *B60R 2011/0084* (2013.01); *B60R 2011/0089* (2013.01)

(58) Field of Classification Search
CPC ......... B60R 11/0241; B60R 2011/0026; B60R 2011/0056; B60R 2011/0075; B60R 2011/0078; B60R 2011/0084; B60R 2011/0089; B60R 2011/0071; B60R 11/02
USPC .... 248/316.5, 924, 681, 678, 274.1, 346.07, 248/147, 126, 313, 154, 689, 544, 316.7; 361/679.55, 679.56, 679.57, 679.58, 361/679.26, 679.38, 679.37
See application file for complete search history.

(56) References Cited

U.S. PATENT DOCUMENTS

| | | | | | |
|---|---|---|---|---|---|
| 591,905 | A | * | 10/1897 | White | A47B 23/042 |
| | | | | | 248/451 |
| 1,321,941 | A | * | 11/1919 | Palmer | A47B 23/042 |
| | | | | | 248/452 |
| 3,061,969 | A | * | 11/1962 | Lunday | B42D 9/00 |
| | | | | | 248/448 |
| 4,955,576 | A | * | 9/1990 | Moberg | B60N 3/005 |
| | | | | | 248/452 |
| 5,102,087 | A | * | 4/1992 | Brunell | A47B 19/10 |
| | | | | | 248/229.12 |
| 5,195,711 | A | | 3/1993 | Miller et al. | |
| 5,480,115 | A | * | 1/1996 | Haltof | F16M 11/041 |
| | | | | | 248/221.11 |

(Continued)

FOREIGN PATENT DOCUMENTS

| | | | | |
|---|---|---|---|---|
| CN | 103123034 A | * | 5/2013 | |
| CN | 204578606 U | * | 8/2015 | |

(Continued)

*Primary Examiner* — Kimberly T Wood
(74) *Attorney, Agent, or Firm* — Perkins IP Law Group LLC; Jefferson Perkins

(57) ABSTRACT

A windshield mount for a personal electronic device has a first support plate that pivots relative to a base and a second support plate that stays in the same plane but slides to fit the width of the device. Using one hand, the user pinches opposed finger tabs to snap the mount to an open configuration. To install the device in the mount after it has been affixed to a vehicle windshield, the user need use only one hand to press the back of the device against the pivoting support plate, snapping the mount back to a closed configuration.

19 Claims, 22 Drawing Sheets

(56) References Cited

U.S. PATENT DOCUMENTS

| | | | | |
|---|---|---|---|---|
| 5,553,824 | A | * | 9/1996 | Dutra, Jr. ............... G06F 1/1632 |
| | | | | 248/924 |
| 5,624,064 | A | | 4/1997 | Mcgee |
| 5,678,793 | A | | 10/1997 | Hill |
| 5,722,691 | A | * | 3/1998 | Patel ........................ B42D 9/00 |
| | | | | 281/45 |
| 5,745,565 | A | | 4/1998 | Wakefield |
| 6,101,684 | A | * | 8/2000 | Ginocchio ................ F16L 3/23 |
| | | | | 24/270 |
| 6,644,987 | B2 | | 11/2003 | Meleck |
| 7,040,590 | B2 | | 5/2006 | Carnevali |
| 7,140,586 | B2 | | 11/2006 | Seil et al. |
| D558,769 | S | | 1/2008 | Krieger et al. |
| 7,731,144 | B2 | | 6/2010 | Kazyaka |
| 9,254,793 | B2 | | 2/2016 | Won |
| 9,587,782 | B2 | * | 3/2017 | Johnson ............... F16M 11/105 |
| 9,950,731 | B2 | | 4/2018 | Kim et al. |
| D832,248 | S | | 10/2018 | Sukphist et al. |
| 10,576,905 | B1 | | 3/2020 | Macneil et al. |
| D900,087 | S | | 10/2020 | Leeds-Frank et al. |
| 10,932,601 | B1 | | 3/2021 | Fan |
| D934,231 | S | | 10/2021 | Liao |
| 2006/0196902 | A1 | * | 9/2006 | Chen ........................ A45F 5/021 |
| | | | | 224/669 |
| 2012/0091304 | A1 | * | 4/2012 | Chuang ............... G11B 33/124 |
| | | | | 248/316.5 |
| 2013/0277520 | A1 | * | 10/2013 | Funk .................... G06F 1/1626 |
| | | | | 248/274.1 |
| 2015/0215483 | A1 | * | 7/2015 | Farnsworth ........ H04N 1/00557 |
| | | | | 348/375 |
| 2015/0282600 | A1 | | 10/2015 | Richards |
| 2016/0095236 | A1 | * | 3/2016 | Zhou ..................... F16M 11/40 |
| | | | | 248/447.2 |
| 2018/0023760 | A1 | * | 1/2018 | Oh ........................ F16M 11/08 |
| | | | | 248/230.7 |
| 2020/0290522 | A1 | * | 9/2020 | Iverson ............... H04B 1/3877 |

FOREIGN PATENT DOCUMENTS

| | | | | |
|---|---|---|---|---|
| CN | 115307011 | A | * | 11/2022 |
| KR | 20160001238 | U | * | 4/2016 |

* cited by examiner

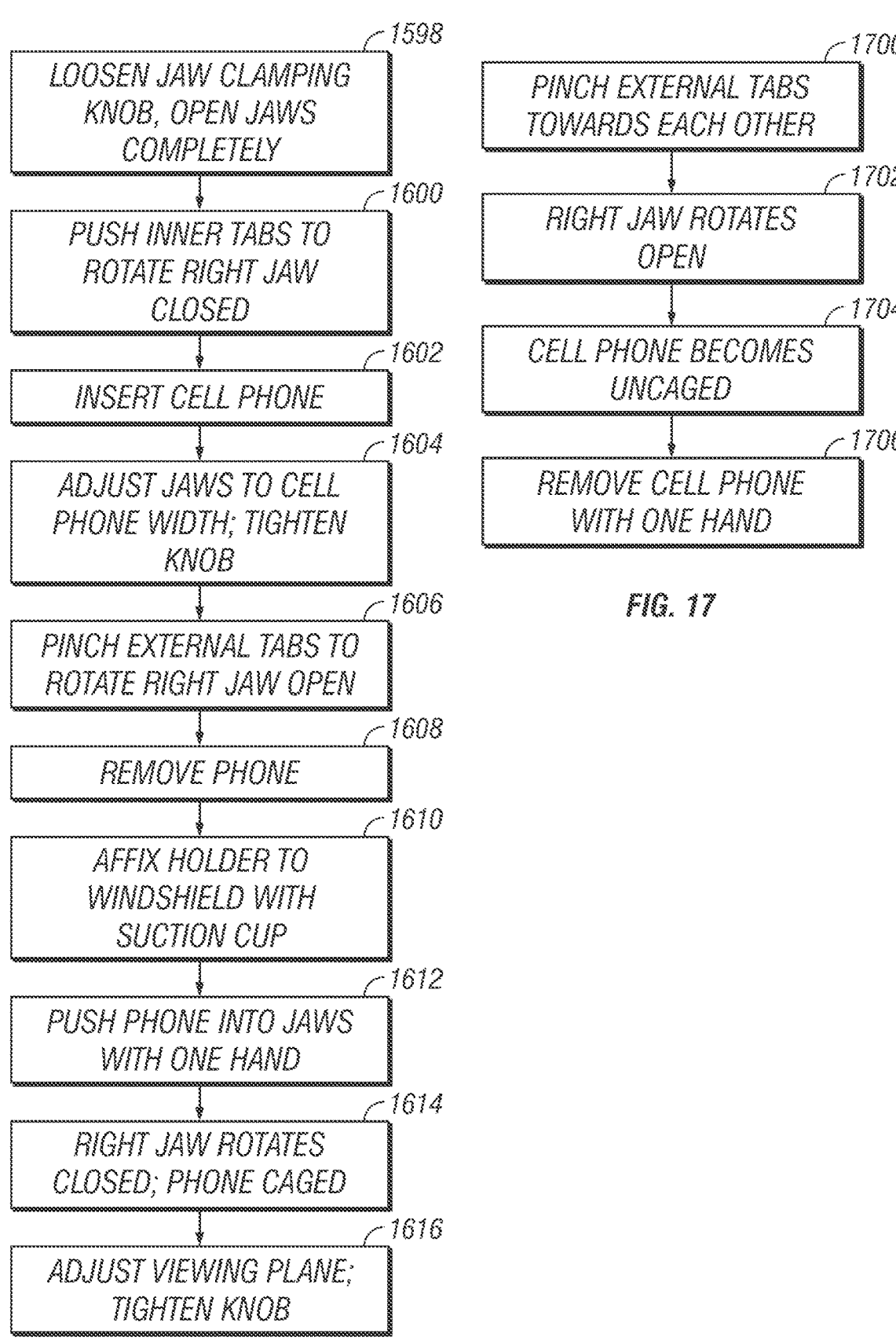

*1598*

LOOSEN JAW CLAMPING KNOB, OPEN JAWS COMPLETELY

*1600*

PUSH INNER TABS TO ROTATE RIGHT JAW CLOSED

*1602*

INSERT CELL PHONE

*1604*

ADJUST JAWS TO CELL PHONE WIDTH; TIGHTEN KNOB

*1606*

PINCH EXTERNAL TABS TO ROTATE RIGHT JAW OPEN

*1608*

REMOVE PHONE

*1610*

AFFIX HOLDER TO WINDSHIELD WITH SUCTION CUP

*1612*

PUSH PHONE INTO JAWS WITH ONE HAND

*1614*

RIGHT JAW ROTATES CLOSED; PHONE CAGED

*1616*

ADJUST VIEWING PLANE; TIGHTEN KNOB

PINCH EXTERNAL TABS TOWARDS EACH OTHER

*1702*

RIGHT JAW ROTATES OPEN

*1704*

CELL PHONE BECOMES UNCAGED

*1706*

REMOVE CELL PHONE WITH ONE HAND

FIG. 17

WINDSHIELD MOUNT FOR PERSONAL ELECTRONIC DEVICE

BACKGROUND OF THE INVENTION

It is known to mount a personal electronic device, such as a cell phone, a tablet or a GPS device, in a vehicle interior. Mounts have been provided to mount the device to a variety of interior surfaces, such as a cupholder, a heater/air conditioning vent, a dashboard or the inside surface of the vehicle windshield.

Recent models of these devices have displays that take up the entire front of the device. Ideally, the front surface should be presented to the driver in a plane orthogonal to the driver's line of sight. Further, the lens of the human eye changes shape when it changes focus from a an object closer to the eye to an object farther away from it. When driving, what is happening out on the road is close to infinity in terms of lens focus. To minimize the disparity in focus, the device could be positioned on the windshield to be as far from the driver as possible. It is also advantageous to position any such display such that the driver does not have to divert his or her line of sight from what is happening on the road. But, for many such devices, it is advantageous to position the device within arm's reach of the driver.

This in turn means that the device should be mounted close to the interior surface of the windshield, not far from the driver's forward line of sight. In most current vehicles, the windshield slants upwardly and rearwardly by a considerable angle. Mounting the device close to the windshield interior surface effectively obstructs the removal of the device from the mount in a vertical direction, and likewise prohibits the reinstallation of the device into the mount from this direction.

Ideally, a device should be able to be installed into the mount in a horizontal direction, and removed from the mount the same way. Further, it would be ideal to install the device into, and remove the device from, the mount with one hand. To date no such mount has been provided.

SUMMARY OF THE INVENTION

According to one aspect of the invention, a mount for a personal electronic device is provided. The mount, which can be for a cell phone, a tablet, a GPS device or the like, is configurable to assume an open configuration in which the device may be removed from the mount in a predetermined first direction, such as rearward, and a closed configuration in which the device may not be so removed in that direction. The mount has first and second support plates operable to support the device. The first support plate is substantially oriented in a first plane when the mount is in the closed configuration, and is substantially oriented in a second plane at an angle to the first plane in when the mount is in the open configuration. In either configuration, the second support plate stays substantially oriented in the first plane.

In one embodiment, the first support plate is part of a first jaw and the second support plate is part of a second jaw. The first jaw has a laterally inwardly facing first channel. The second jaw has a laterally inwardly facing second channel. The first channel is adapted to cage a first lateral side of the device when the mount is in the closed configuration. The second channel is adapted to cage a second lateral side of the device, with the second lateral side being laterally spaced from the first lateral side. The second jaw is laterally slidable relative to a base of the mount so as to size a width between the first channel and the second channel of the mount to a width of the device between its first and second lateral sides.

In one embodiment, the first support plate is a portion of a first jaw. The first jaw has a first channel surface which rearwardly extends from the first support plate to a rearward end. A first lip of the first jaw laterally inwardly extends from the rearward end of the first channel surface. The first support plate and the first lip are operable to cage the first lateral side of the device when the mount is in the closed configuration. In the open configuration, the first lip is laterally outwardly displaced, such that the first lateral side of the device is no longer caged between the first support plate and the first lip. This permits the device to be removed from the mount in the first direction.

In another aspect of the invention, a mount for a personal electronic device is provided, wherein the mount is configurable to an open configuration in which the device may be removed from the mount in a predetermined first direction, such as towards the rear, and is further configurable to assume a closed configuration in which the device may not be removed from the mount in the first direction. The mount has a base with a laterally outwardly extending first finger tab, and a holding element hinged to the base and having a laterally outwardly extending second finger tab. The second finger tab is spaced from the first finger tab by a first distance when the mount is in the open configuration. The second finger tab is positioned to be farther away than the first distance from the first finger tab when the mount is in the closed configuration. A user may pinch the first and second finger tabs, moving the second finger tab toward the first finger tab, in order to reconfigure the mount from the closed configuration to the open configuration.

In another aspect of the invention, a mount for a personal electronic device is configurable to assume an open configuration in which the device may be removed from the mount in a predetermined first direction, such as rearward, or to assume a closed configuration in which the device may not be removed from the mount in the first direction. The mount has a base and a first support plate hinged to the base at an axis. At least one tab of the first support plate extends radially inwardly relative to the axis. The first support plate substantially occupies a first plane when the mount is in the closed configuration, and substantially occupies a second plane when the mount is in the open configuration. The second plane is at an angle to the first plane. The tab is operable to contact a back of the device when it is desired to install the device into the mount in a second direction opposite the first direction. A predetermined force exerted by the user through the back of the device will cause the first support plate to pivot from the second plane to the first plane, thereby causing the mount to be reconfigured from the open configuration to the closed configuration.

In one embodiment, the mount has a second support plate that has an inner margin. The second support plate is substantially aligned with the first plane. The second support plate has a laterally extending slot. A fastener extends in the first direction from the base and into the slot, such that the second support plate is slidably affixed to the base. The second support plate is laterally slidable from a narrowest position in which the second support plate is closest to the first support plate, to a widest position in which the second support plate is farthest away from the first support plate. In the narrowest position, the tab of the first support plate abuts an inner margin of the second support plate.

In one embodiment, the aforementioned tab is one of an upper and lower tab on the first support plate. A center portion of the right margin of the second support plate extends more to the right than does either an upper portion or a lower portion of this margin, so as to extend the slot, and therefore the lateral distance through which the second support plate can slide. When mated together at a minimum width position, the center portion of the second support plate right margin is disposed rightward of the upper and lower inner tabs of the first support plate.

In one embodiment, the first support plate is operable to be moved from the first plane to the second plane, and vice versa. A detenting structure indexes the first and second planes, so that the mount snaps open and closed. The detenting structure resists up to a predetermined degree of rotational force, to keep the mount in the desired open or closed configuration, and provides tactile and aural feedback to the user confirming that the desired configuration has been achieved.

In another aspect of the invention, a mount for a personal electronic device includes a base that is substantially oriented to a base plane. A pivoting jaw is hinged to the base at an axis. The axis is disposed parallel to the base plane. The pivoting jaw is pivotable between a closed configuration in which the device may not be removed from the mount in a predetermined first direction, such as rearward, and an open configuration in which the device may be so removed. The pivoting jaw has a side plate extending in the first direction to a side plate end. A lip of the pivoting jaw extends laterally inwardly from the side plate end by a lip width to an inner lip end. The inner lip end is at a predetermined radius from the axis, where the radius is orthogonal to the axis. A position of the inner lip end while in the open configuration is separated from a position of the inner lip end while in the closed configuration by an angle measured around the axis. A ratio of the lip width to the radius is no greater than a sine of the angle, such that in the open configuration, the inner lip end will be angularly displaced out of the way from a path of a lateral side of the electronic device as the device is being removed from the mount in the first direction.

In another aspect of the invention, a method for mounting a personal electronic device to a surface is provided. The surface may, for example, be an interior surface of a slanting vehicle windshield. A mount is provided that has a closed configuration in which the device may not be removed from the mount in a predetermined first direction (such as rearward), and an open configuration in which such removal is possible. The mount further has a base and an attachment arm with a first end fastened to the base and a second end remote from the base.

The mount is either received by the user in the closed configuration, or the user places the mount in the closed configuration. Next, the device is placed on the first and second support plates of the mount. The second support plate is slid in a first plane relative to the base, so that a channel rearwardly extending from the second support plate cages a second lateral side of the device, and so that a channel rearwardly extending from the first support plate cages a first lateral side of the device, with the second lateral side being spaced from the first lateral side. Next, the device is removed from the mount, in a second direction substantially orthogonal to the first direction, such as upward. Alternatively the user may pinch the external tabs of the first jaw and the base to put the first support plate in an open configuration, thereby permitting the electronic device to be removed from the mount in a rearward direction.

The now-empty but width-adjusted mount is next attached, by the second end of the attachment arm, to the surface. If he or she has not already done so, the user then pivots the first support plate relative to the base, such that the first support plate is substantially aligned to a second plane that is tilted relative to the first plane. This configures the mount to the open configuration. The user then moves the device in a third direction which is opposite the first direction (e.g. forward) until the back of the device contacts the first support plate. The user further moves the device in the third direction, causing the first support plate to pivot from the second plane back to the first plane, thereby caging the first lateral side of the device and preventing the device's removal from the mount in the first direction. This securely holds the electronic device relative to the windshield.

Later, the user may wish to remove the device from the mount. This is accomplished by pinching a first finger tab, which laterally outwardly extends relative to the first support plate, toward a second finger tab, which laterally outwardly extends from the base. This pivots the first support plate to the second plane, and causes the first lateral side of the device to be uncaged from the first channel, permitting the device to be removed from the mount in the first direction.

The mount may therefore hold the electronic device in close proximity to the inner surface of the windshield, and in a position in which it would not be possible to lift the device upwardly out of the jaws of the mount. With one hand, the user pinches together the finger tabs, opening the mount and permitting the removal of the device from the mount. To install the device, the user simply presses, with one hand, the back of the device against the inner tab(s) of the pivoting support plate, causing the first support plate to pivot back to the closed configuration. As so installed, the device is closer to the focal plane that the driver is using while driving on the road, enhancing the acuity with which the driver perceives road conditions and decreasing any loss of focus on the road caused by focusing on the device screen.

BRIEF DESCRIPTION OF THE DRAWINGS

Further aspects of the invention and their advantages can be discerned in the following detailed description as read in conjunction with the drawings of an exemplary embodiment, in which like characters denote like parts and in which:

FIG. 16 is a block diagram of steps of a process for installing a cell phone in a mount according to the invention, and affixing the mount to the interior surface of a windshield;

FIG. 17 is a block diagram of steps of a process for removing a cell phone from the mount after the mount has been affixed to a windshield;

DETAILED DESCRIPTION

As used herein, "front" and "forward" connote a direction toward the windshield and the front of a vehicle, and "rear" and "rearward" connote a direction away from the windshield and toward the vehicle interior.

Figure 1:
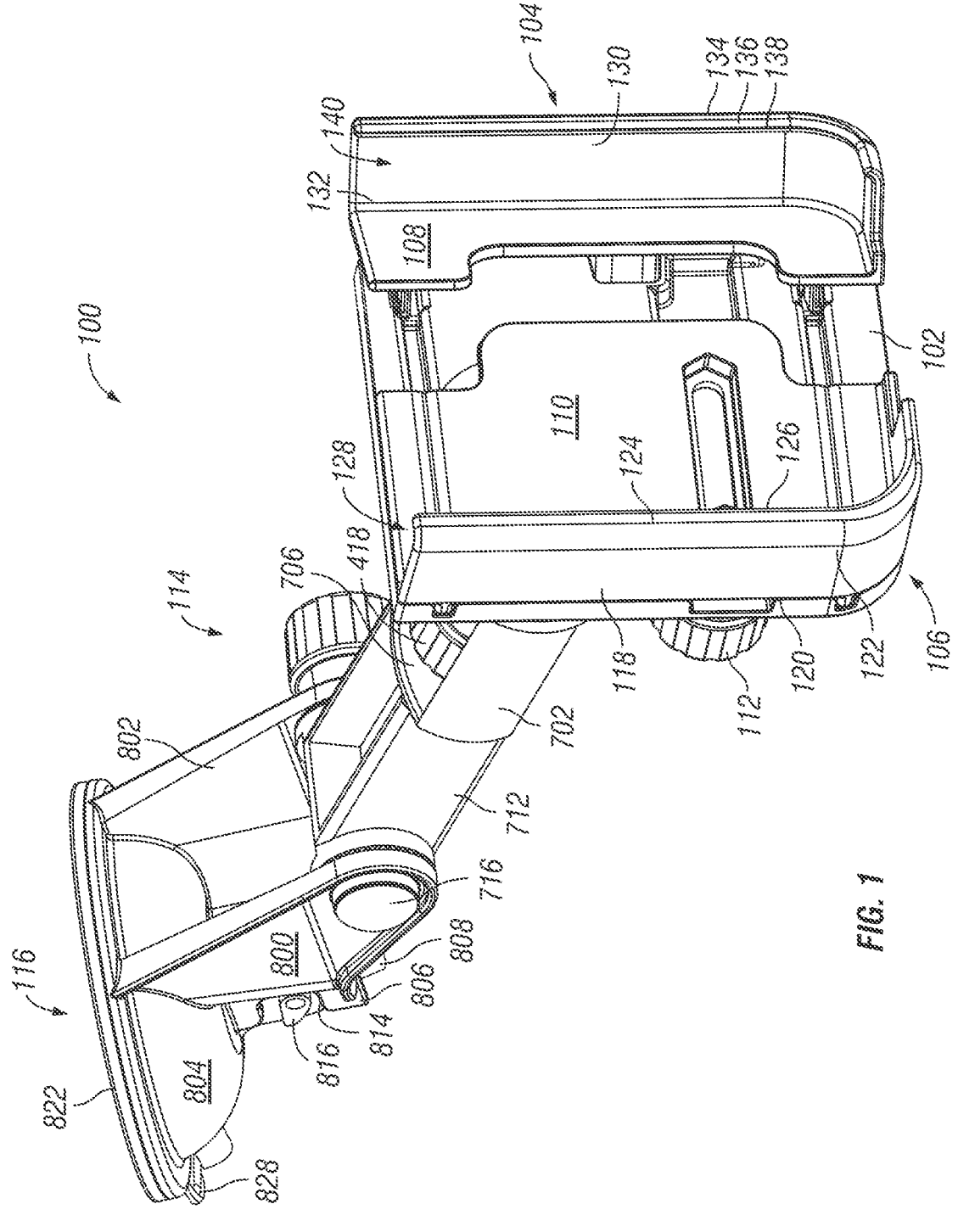
FIG. 1 is a perspective view of a mount according to the invention, from a rear and side direction, jaws of the mount being in an intermediate position relative to each other, a first jaw being rotated to an open or release configuration.

A personal electronic device windshield mount is indicated generally at 100 in FIG. 1. The mount is useful for holding any of a number of relatively small, flat, typically handheld electronic devices, including cell phones, tablets, audio players, map displays, personal digital assistants and the like. The invention will be described in conjunction with a mobile phone, also called a "smart phone" or a cell phone. These phones typically are rectangular, have heights that greatly exceed their widths, and thicknesses that are small fractions of their widths. Recent cell phones have a display that takes up the entire front surface of the phone.

The mount 100 has a base 102 to which are articulably mounted a first (right) jaw 104 and a second (left) jaw 106. Jaw 104 has a support plate 108, while jaw 106 has a support plate 110. In the illustrated open or release configuration, support plate 110 is residing in a first plane, while support plate 108 is residing in a second plane that is rearwardly and inwardly tilted relative to the first plane. The support or back plates 108 and 110 support a back surface of the cell phone. In the illustrated embodiment, the rear surface of base 102 and plate 110 of left jaw 106 substantially occupy planes that are parallel to each other. In the "open" or "release" configuration, the held device (not shown in this figure) may be removed in a rearward direction orthogonal to the plane of support plate 110.

In the illustrated embodiment, jaws 104 and 106 move with respect to base 102 in different ways. Jaw 106 may laterally (that is, side-to-side or in a direction at right angles to the front and rear directions) slide toward and away from jaw 104, but will always reside in the same plane. Jaw 104 does not slide in this embodiment, but instead rotates about an axis that is parallel to the first and second planes. In this embodiment, the jaw 106 slides with respect to base 102, and may be affixed to base 102, after slidable adjustment, by means of a clamping bolt or screw 112. Jaw 104, on the other hand, is hinged to or pivots relative to the base 102.

In other embodiments, the positions of rotating jaw 104 and sliding jaw 106 could be reversed, so that the rotating jaw is disposed on the left side, while the sliding jaw is disposed on the right side. A mount with such reversed jaw positions may be more suitable for left-handed users, as the installation of the device into and extraction of the device from the mount may be done with one hand. In another embodiment, two rotating jaws could be provided. In even another alternative embodiment, one jaw could be entirely fixed while the other jaw both rotates and slides.

The base 102 is spherically, or otherwise rotationally, mounted to a rearward end of an elongate attachment arm 114. The attachment arm 114 extends forwardly from the base 102 to a surface affixation member 116, which may be a suction cup suitable for attachment by partial vacuum to a glossy surface such as the interior surface of a windshield. In view of the fact that windshields tilt upwardly and rearwardly by varying degrees based on the make and model of the vehicle, different models of the mount 100 could be provided with any of a number of arms 114 of different lengths, and/or different surface affixation members 116 that make different angles to the arms 114.

Figure 18:
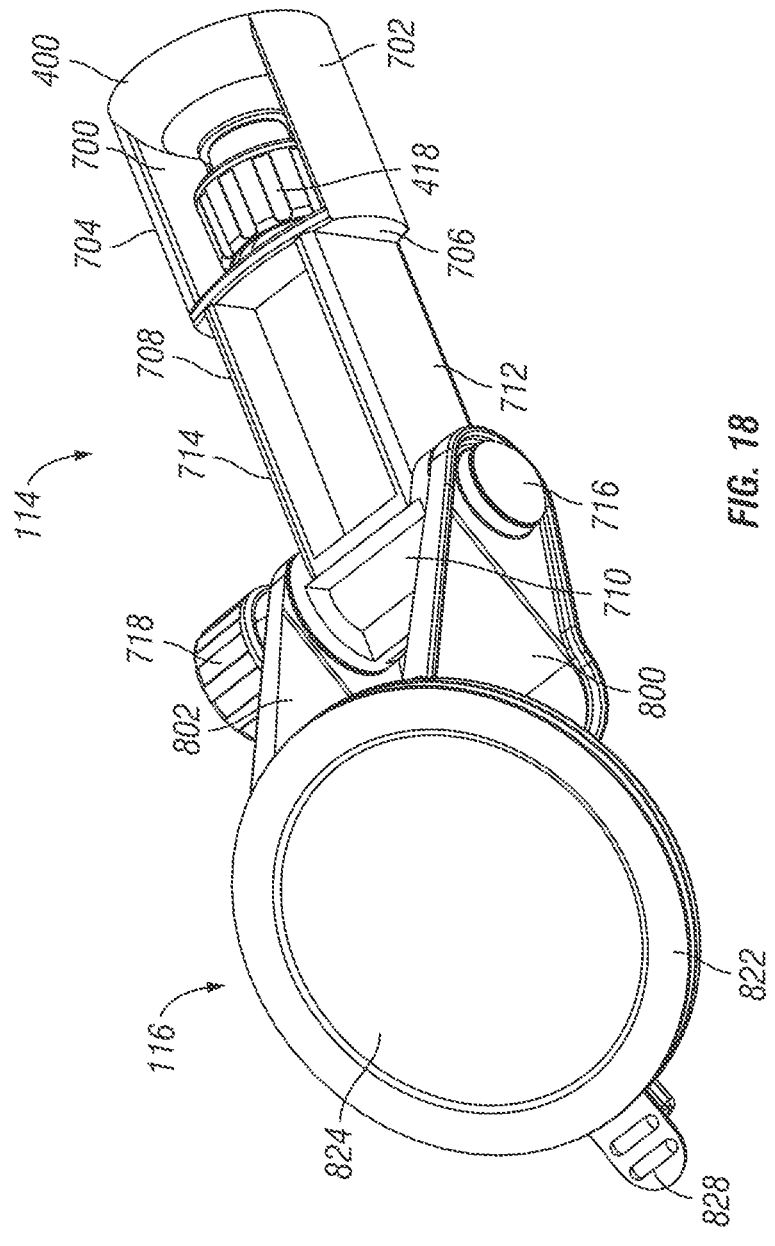
FIG. 18 is a perspective detail, taken from above, of attachment arm and suction cup assemblies for use with the invention.
Figure 19:
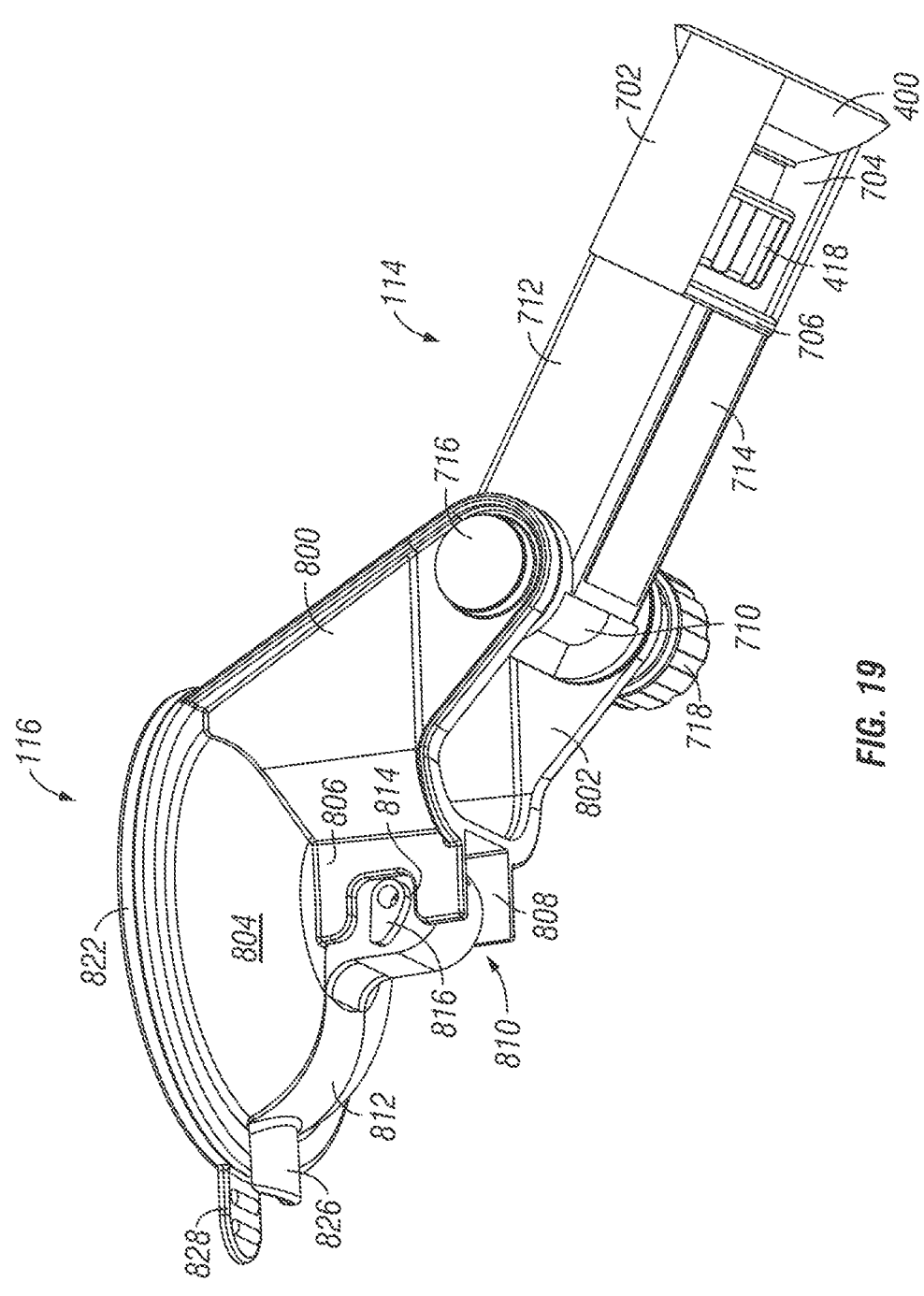
FIG. 19 is a perspective detail, taken from below, of attachment arm and suction cup assemblies shown in FIG. 18.
Figure 20:
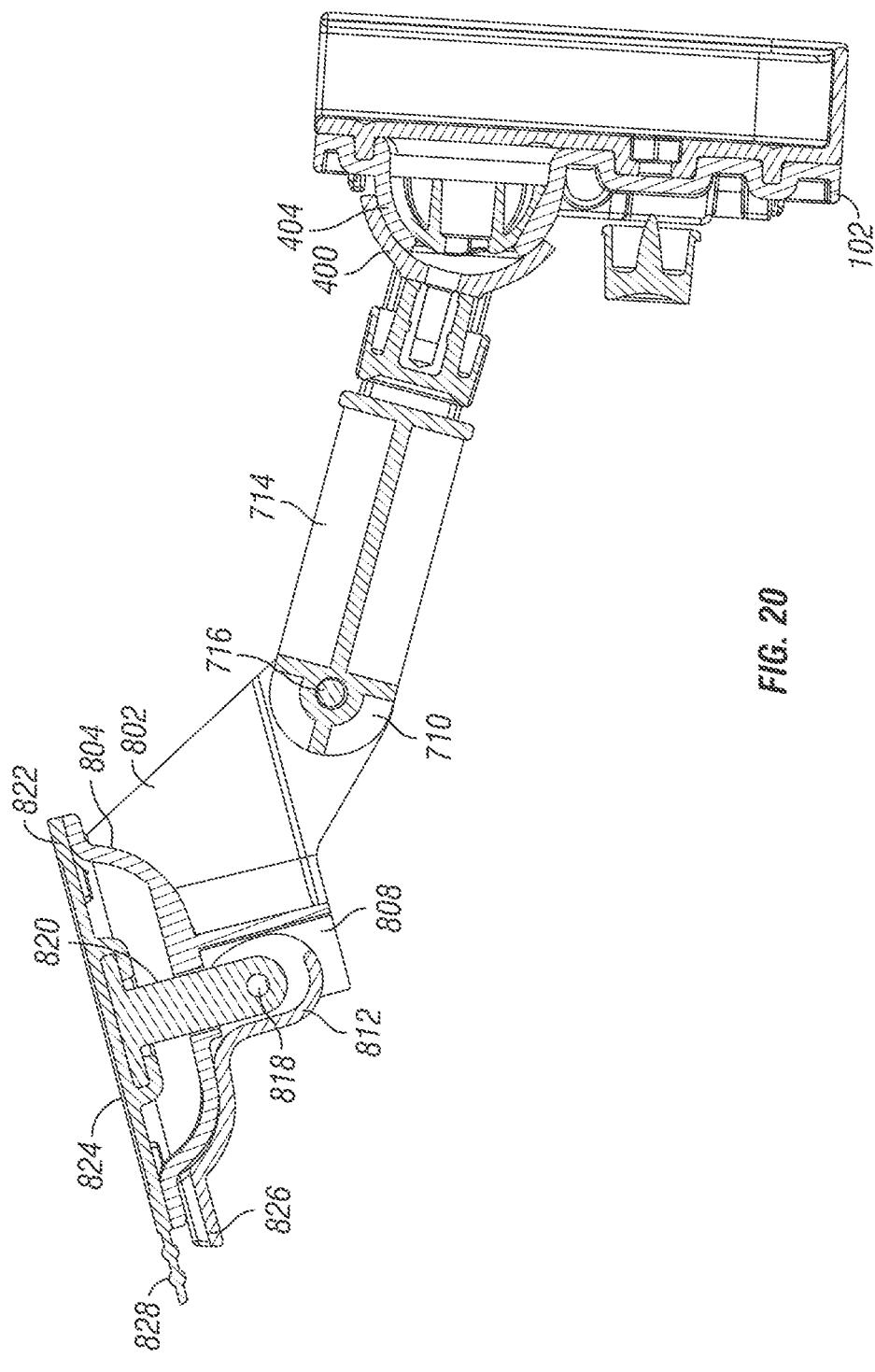
FIG. 20 is a sectional view taken substantially along an axis of the attachment arm and suction cup assemblies shown in FIGS. 18 and 19.

FIGS. 18-19 are perspective details of a representative attachment arm assembly 114 which could be used with the invention, as joined to a suction cup assembly 116 which also could be used with the invention. Attachment arm assemblies and suction cup assemblies other than those illustrated could be used. FIG. 20 is a sectional view of the attachment arm and suction cup assemblies shown in FIGS. 18-19. The exploded view of FIG. 4 also supplies details of the arm assembly 114 and the suction cup assembly 116.

The rear end of the illustrated attachment arm assembly 114 takes the form of a cup or partial sphere 400 (FIG. 4), the rearwardly facing concave surface of which will act as a portion of a ball joint, as will be later described. A knob 418 for a ball joint clamp (further described below) is housed within a space 700 bounded by a first leg 702 and a second leg 704. Legs 702 and 704 are spaced apart from each other and are long enough to house the knob 418 even where knob 418 has been unscrewed on its bolt shaft (described below) to a loose position. Space 700 intentionally is open to the top and bottom so as to permit the fingers of the user to tighten or loosen knob 418.

The rear ends of legs 702 and 704 are joined to the cup 400, as by being integrally molded with it. Legs 702 and 704 are parallel to each other and to an axis of the arm assembly. The legs 702 extend forwardly to and are joined to a transverse plate 706. A further section 708 of the arm assembly 114 extends forwardly from the plate 706 to a pivot housing 710. Section 708 can take any convenient form. In the illustrated embodiment, the section 708 consists of two spaced-apart parallel members 712 and 714. The members 712 and 714, and legs 702 and 704, may be wider in a vertical direction than they are in a horizontal direction, thereby better supporting the combined weight of the cell phone mounting bracket and cell phone mounted on the rearward end of the arm.

The pivot housing 710 forms a transverse bore that accepts the shaft of a carriage bolt 716. A knob 718 is screwed onto the shaft threads of the carriage bolt 716. The suction cup assembly 116 may include two parallel, spaced-apart wings 800 and 802. Rearward ends of the wings 800 and 802 have circular holes through them that each accept the shaft of the carriage bolt 716. Wing 800 is disposed between the head of carriage bolt 716 and pivot housing 710, while wing 802 is disposed between the pivot housing 710 and the knob 718. Housing 710 and bolt 716 form a pivot allowing the angular adjustment of arm assembly 114 with respect to suction cup assembly 116.

As best seen in FIG. 19, the wings 800 and 802 are parallel to each other, are transversely spaced apart and are much taller than they are wide. Wings 800 and 802 extend forwardly until they are joined to a suction cup dish member 804. The dish member is hollow in an upward-forward direction (FIG. 20) and is rigid. A plate 806 extends forwardly from wing 800 and downwardly from dish 804, and a plate 808 extends forwardly from wing 802 and downwardly from dish 804. The parallel plates 806 and 808 define therebetween a slot 810 that receives a camming lever 812. The plate 806 has a forwardly open u-shaped surface 814 that acts as a camming surface against which a cam 816 is in contact. Cam 816 is formed to transversely outwardly extend from the general vertical surface of camming lever 812, so as to interact with camming surface 814. The right plate 808 has a similar camming surface 809 formed in it (FIG. 3), and a cam 817 similar to cam 816 extends from the right face of camming lever 812 to interact with it.

As seen in FIG. 20, a lower end of the camming lever 812 has a hole therethrough that accepts a pin 818. The pin 818 in turn is threaded through hole(s) of a bottom end of a rod 820. The rod 820 is positioned substantially along the axis of dish 804, and extends upwardly and forwardly through a hole in dish 804 until it is joined by any suitable means a rearward surface of an elastomeric disk 822. A conical spring 830 (FIG. 4) may be inserted to be coaxial with and disposed around the rod 820, with a larger-diameter end thereof facing the disk 822 and a smaller-diameter end thereof contacting the inner surface of dish 804.

In FIGS. 18-20, camming lever 812 is in a closed position, in which an upper surface 824 of the disk 822 adheres by partial vacuum to the inner side of a glass windshield or other glossy surface. In the closed position, the rod 820 is displaced downwardly and rearwardly along the suction cup axis. It is forced into this position by the action of cam 816 against camming surface 814. Prior to the attachment by the user to the windshield, the user rotates camming lever 812 downward and rearward, to the position shown in FIG. 4. This pushes the rod 820 upwardly and forwardly, and upwardly and forwardly displaces the disk 822, making it flat or more shallow. After the disk 822 has been placed against the windshield, a free end 826 of the camming lever 812 is swung upwardly and forwardly, displacing the rod 820 rearwardly and downwardly and creating a partial vacuum between surface 824 and the windshield. A tab 828 may radially extend from the disk 822 as an aid to later remove the suction cup assembly 116 from the windshield.

Returning to FIG. 1, a side plate 118 of the left jaw 110 extends rearwardly from a left end 120 of the second support plate 110 to an end 122 of the side plate 118. A lip 124 of the left jaw 110 extends from end 122 inwardly, in parallel to support plate 110, to a lip end 126. The second support plate 110, side plate 118 and lip 124 form a channel 128 that in combination cages or holds a left lateral side of the cell phone.

Similarly, a side plate 130 of right jaw 104 extends rearwardly from a right end 132 of the first support plate 108 to a rearward end 134. A right lip 136 extends from end 134 inwardly, in parallel to support plate 108, and generally toward channel 128, to a lip end 138. The first support plate 108, side plate 130 and lip 136 form a channel 140 which, in a first or "closed" configuration, will cage a right lateral side of the cell phone.

Figure 2:
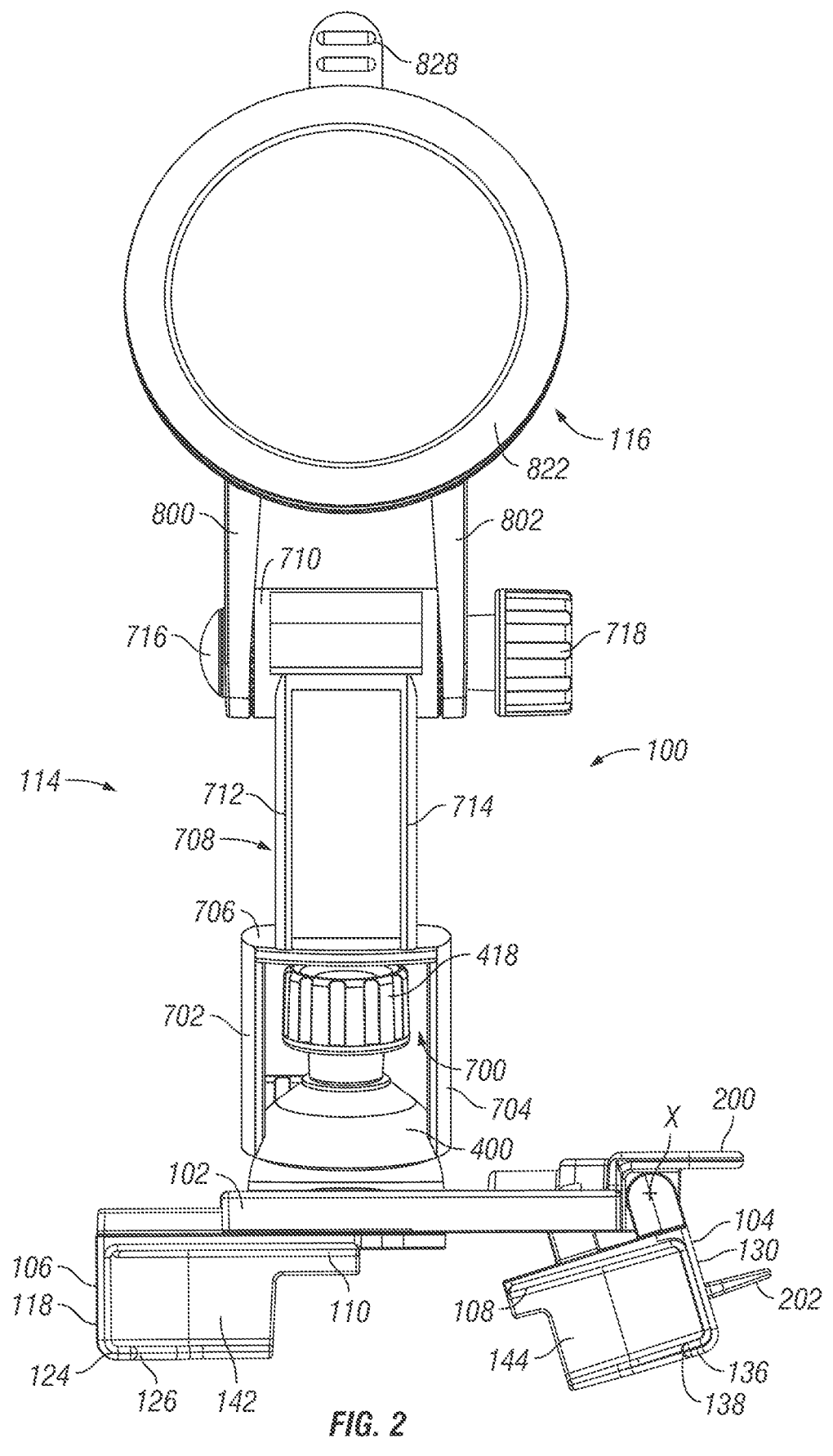
FIG. 2 is a top view of the mount as configured in FIG. 1.

In the top view of FIG. 2, there can be seen a bottom plate 142 that is joined to second support plate 110, second jaw side plate 118, and lip 124. Bottom plate 142 supports part of the weight of the cell phone being held. Similarly, a bottom plate 144 is joined to first support plate 108, right jaw side plate 118 and lip 136. Bottom plate 144 also supports part of the weight of the cell phone, in both the open configuration shown and in the closed configuration. Bottom plates 142, 144 can be considered to be horizontal portions of the respective left and right channels 128 and 140.

A first external finger tab 200 is affixed to, and rightwardly extends from, the base 102. A second external finger tab 202 is affixed to, and rightwardly extends from, side plate 130 of pivoting jaw 104. The finger tab 200 may reside in a plane parallel to the first plane, which then will be orthogonal to the rearward direction. The finger tab 202 may reside in a plane parallel to the plane occupied by first support plate 108, and will rotate around axis X, with support plate 108, as a unit. In the illustrated embodiment, the finger tab 200 is integrally molded as a part of base 102, while finger tab 202 is integrally molded as a part of right jaw 104. Arm 114, base 102, left jaw 106 and right jaw 104 may be separately injection-molded using a tough plastic such as ABS. The right jaw 104 is an example of a cell phone holding element that can assume a closed configuration in which the cell phone is securely held, and an open configuration in which the cell phone may be easily removed from the mount by the user.

The finger tabs 200 and 202 are sized and positioned to be pinched together with the thumb and one finger of one hand of the user, such as the right hand. The user applies pressure with the thumb to a rearward surface of tab 202, and applies pressure with e.g. the index finger to a forward surface of tab 200. The moment arms to these tab surfaces are such that a user will easily be able to overcome the detenting force keeping the first jaw in the closed configuration (described below), and rotate jaw 104 to the open configuration shown, which also is detented.

Figure 3:
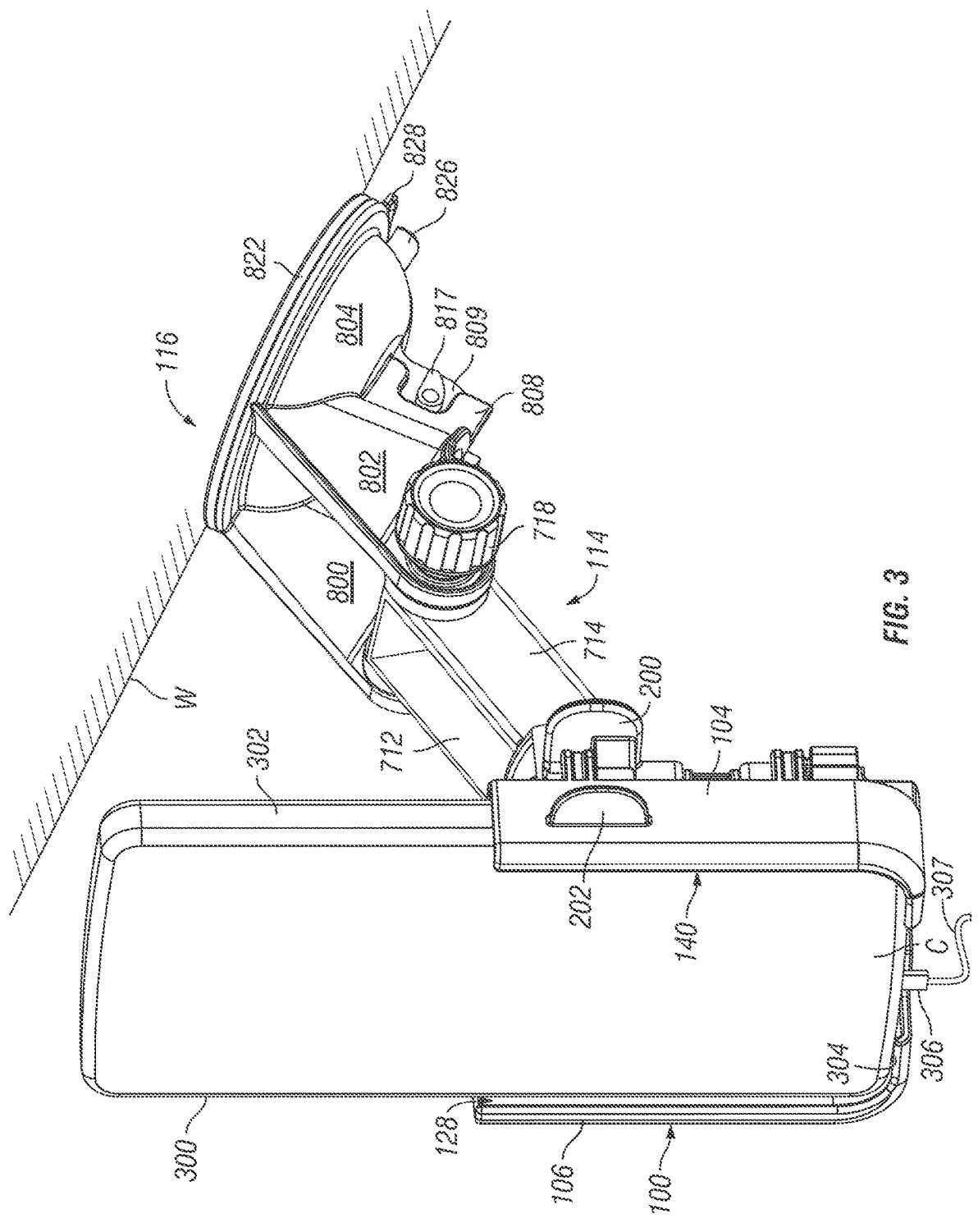
FIG. 3 is a perspective right side view of a mount according to the invention, as affixed to a slanting windshield and as holding a cell phone, the first jaw being rotated to a closed configuration.

In FIG. 3, a cell phone C has been mounted to the interior surface of a windshield W by means of the mount 100. Mount 100 is in the closed configuration in which the cell phone C may not be removed from the mount 100 in a rearward direction, i. e., horizontally away from windshield W. Since the windshield W extends over and rearwardly relative to the cell phone C, the cell phone C may not be removed from mount 100 in an upward direction, either. In the closed configuration, a left lateral side 300 of cell phone C is caged by left jaw channel 128, while a right lateral side 302 of cell phone C is caged by right jaw channel 140. In use, jaws 104 and 106 are open in a vertical direction. Except where windshield W or like surface obstructs this movement, the cell phone C is freely insertable into and removable out of the jaws 104 and 106 in the vertical direction.

Figure 6:
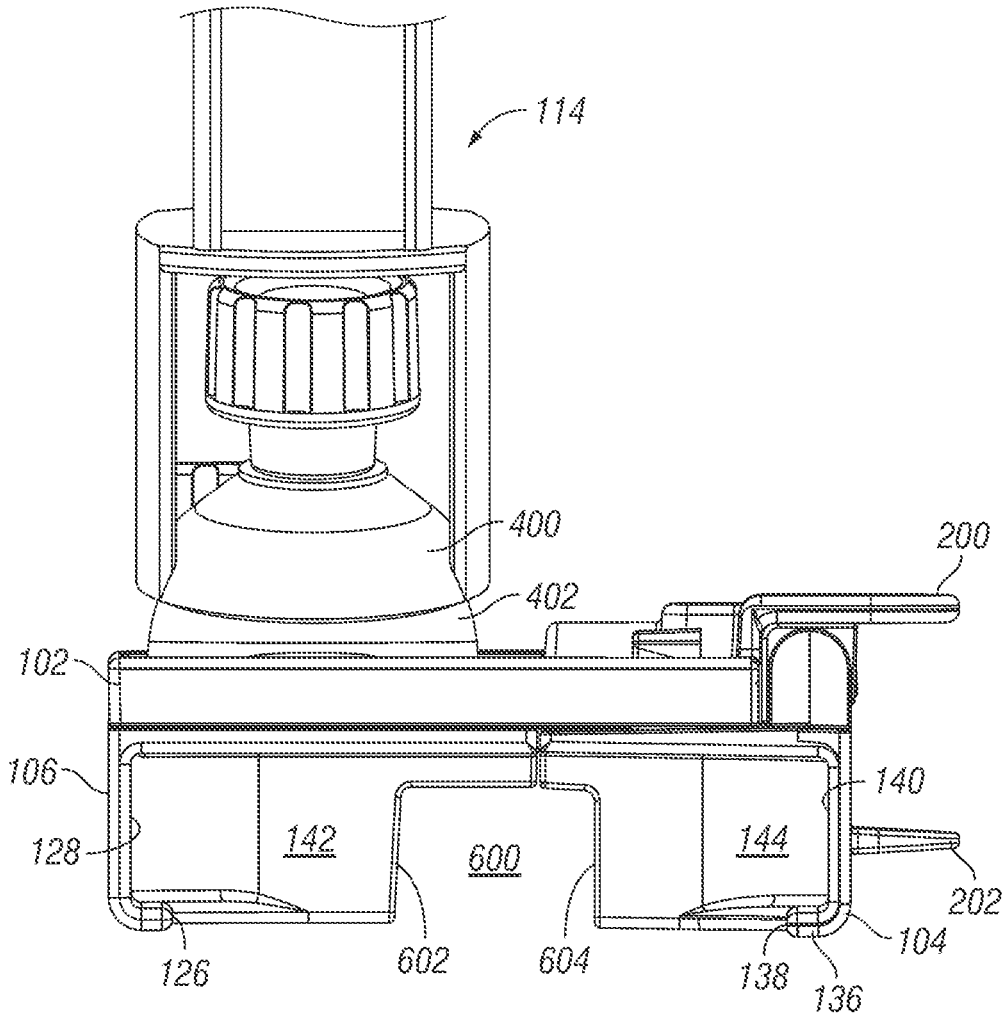
FIG. 6 is a top view of the mount as configured in FIG. 6.

Contemporary cell phones have a power/communications port in the center of a bottom side 304 of the cell phone. A plug 306 such a firewire plug is inserted into this port. To accommodate plug 306 and the flexible cable 307 attached to it, and as is best shown in FIG. 6, a U-shaped bottom opening 600 persists between left jaw 106 and right jaw 104 even when the jaws 106, 104 are in their minimum-width position. The opening 600 is defined by an inner margin 602 of left bottom plate 142 and, continuing from margin 602, an inner margin 604 of the right bottom plate 144. The provision of opening 600 means that the cell phone C (FIG. 3), as having a power/communications cable 307 plugged into it, may be installed into or removed from mount 100 as a unit.

Figure 4:
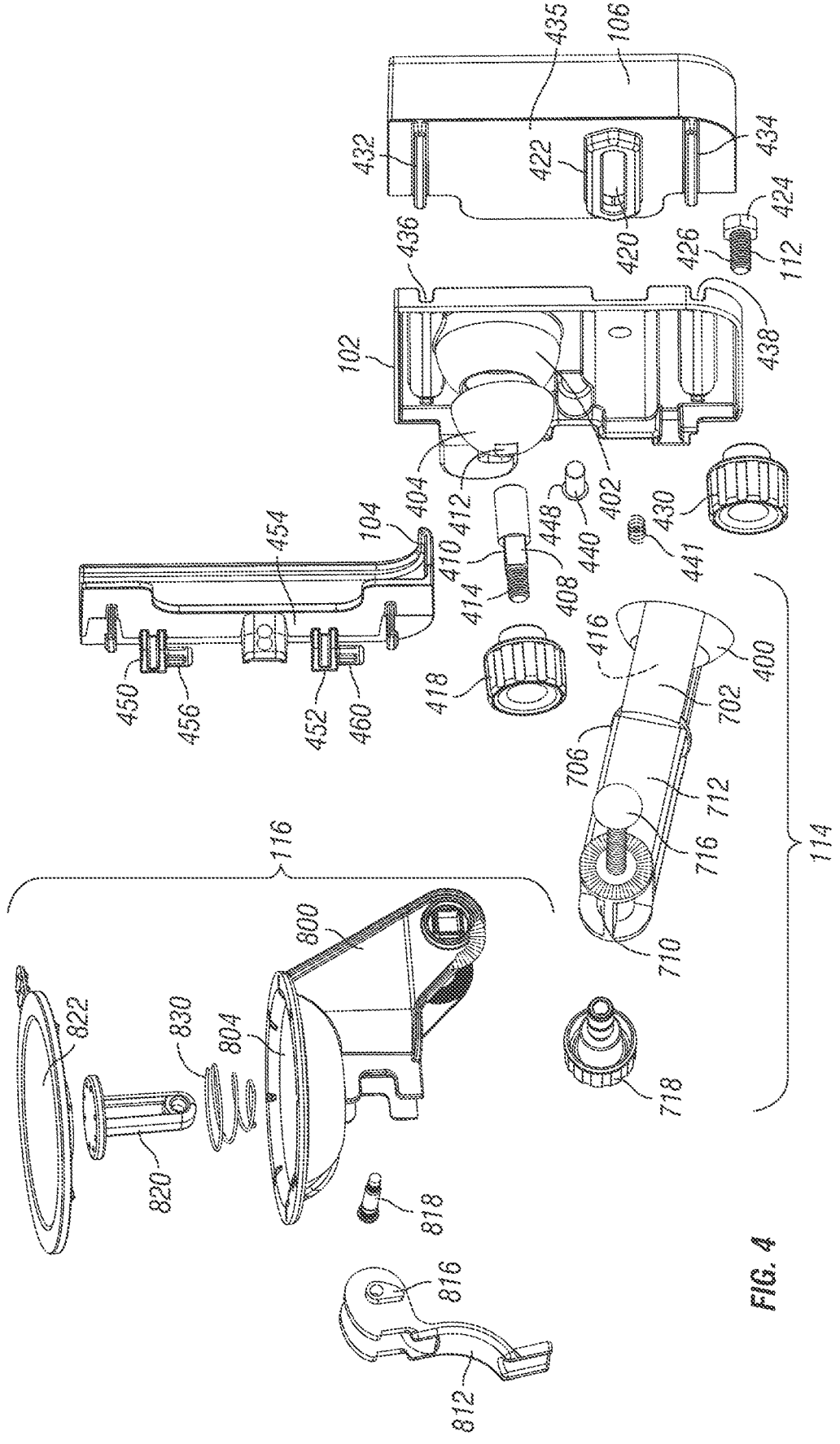
FIG. 4 is an exploded view of the mount shown in FIGS. 1-3.
Figure 4A:
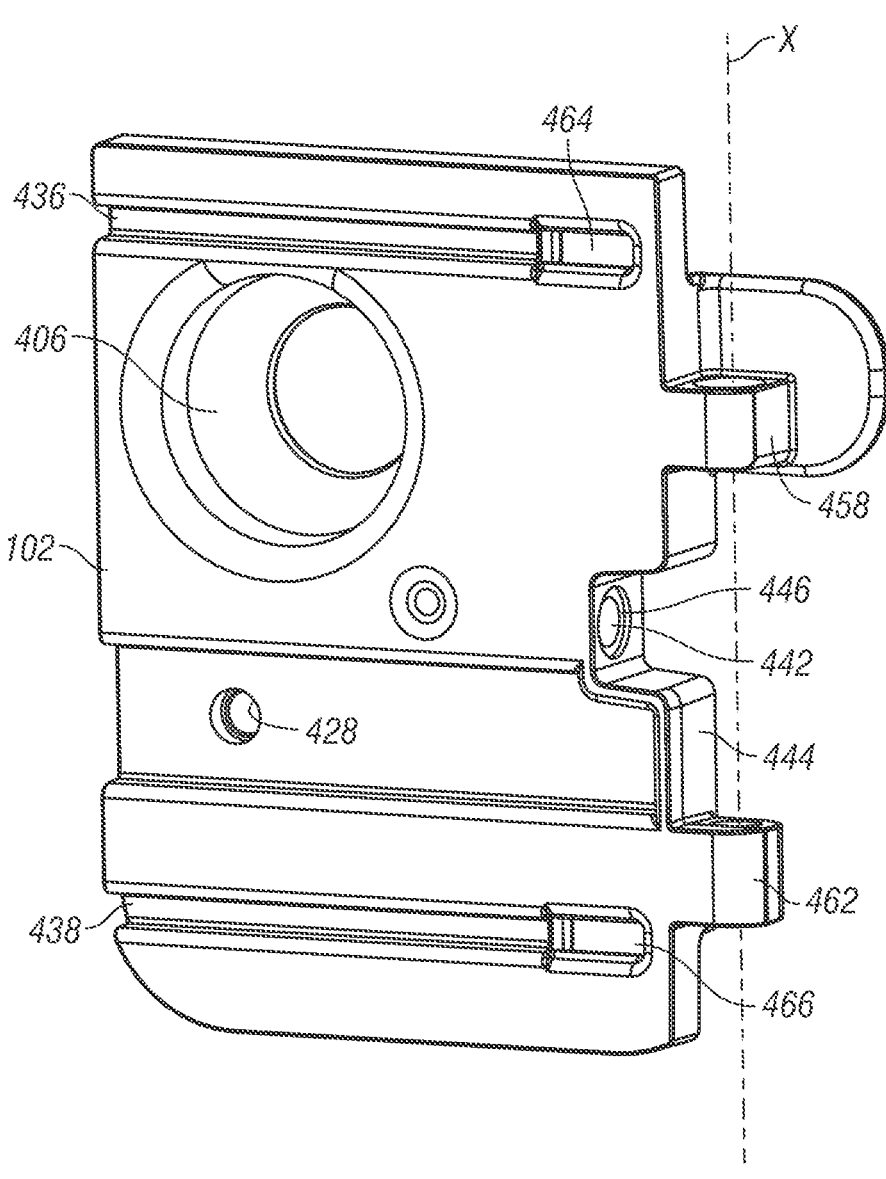
FIG. 4A is a rear view detail of a base plate as disassembled from the mount shown in FIGS. 1-3.

As shown in FIGS. 4 and 4A, the rearward end of attachment arm 114 takes the form of a partial sphere 400. The concave interior surface of sphere 400 fits to the front spherical surface 402 of the base 102. A spherical member 404 rides on a rear spherical surface 406 of the base 102 (FIG. 4A). A square portion 408 of a screw shaft 410 is inserted, in a frontward direction, through a square hole 412 in the spherical member 404. The square hole 412 prevents the spherical member 404 from spinning on surface 402 upon tightening of knob 418. Threads 414 of screw shaft 410 will protrude forwardly beyond the spherical member 404. The screw shaft 410 is then inserted through hole 416 of the partial sphere 400. A knob 418, which may have a metal threaded insert, is then threaded onto exposed threads 414. Parts and surfaces 400-418 form a ball and socket joint. The arm 114 may be rotated on surface 402 to any of a number of positions relative to the base 102, and the selected position can then be clamped in place with knob 418.

The left jaw 106 has an elongate, laterally extending slot 420. A frontwardly recessed region 422 (FIG. 5), with rear-to-front walls that are parallel to the slot 420, receives a hex head 424 of the clamping screw 112. A shaft 426 (FIG. 4) of the clamping screw 112 is inserted through slot 420 and then through hole 428 in the base 102 (FIG. 4A). A knob 430, which may have a threaded metal insert, is then screwed to the exposed threads of shaft 426 to clamp in place the left jaw 106 to the base 102.

A pair of rails 432, 434 (FIG. 4) are formed on a front surface 435 of the jaw 106. Rails 432 and 434 are elongate in a lateral direction, are parallel to each other, and fit within respective channels 436 and 438 of the rear surface of base 102 (FIG. 4A). The rails 432 and 434 and the channels 436 and 438 help constrain jaw 106 to a laterally sliding movement relative to base 102.

A cylinder 440 (FIG. 4) contains a helical detenting spring 441 that spring-loads a detenting ball 1000 (FIG. 10) to partially protrude out of the cylinder 440. The cylinder 440 is press-fit into a socket 442 (FIG. 4A) opening on a right side 444 of the base 102. The socket 442 has an annular recess or countersink 446 that receives a flange 448 of the cylinder 440.

Figure 12:
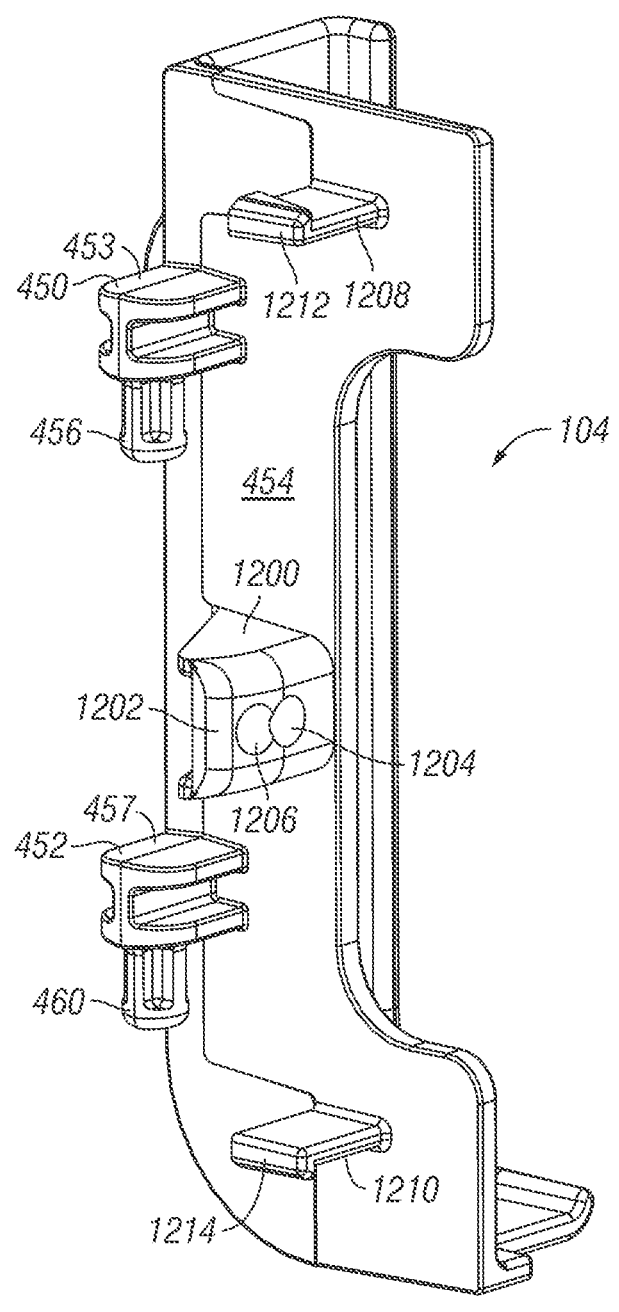
FIG. 12 is a front perspective detail of the first jaw prior to assembly to a base plate of the mount.

As seen in FIG. 12, the right jaw 104 has an upper pin 450 and a lower pin 452 that are preferably integrally molded with the jaw 104. Pin 450 has a shaft-bearing member 453 that extends forwardly from a forward surface 454 of the jaw 104. A shaft 456 of pin 450 downwardly extends from an end of shaft-bearing member 453 to be received within upper socket 458 (FIG. 4A) formed at the right side 444 of the base 102. A shaft-bearing member 457 (FIG. 12) of pin 452 extends forwardly from surface 454 at a position downwardly displaced from pin 450. A shaft 460 of pin 452 downwardly extends from an end of shaft-bearing member 457 to be received within lower socket 462 formed at the right side 444 of the base 102 (FIG. 4A). The bores of sockets 458 and 462 are disposed on axis X and permit pin shafts 456 and 460, and the rest of jaw 104, to rotate around axis X.

Figure 5:
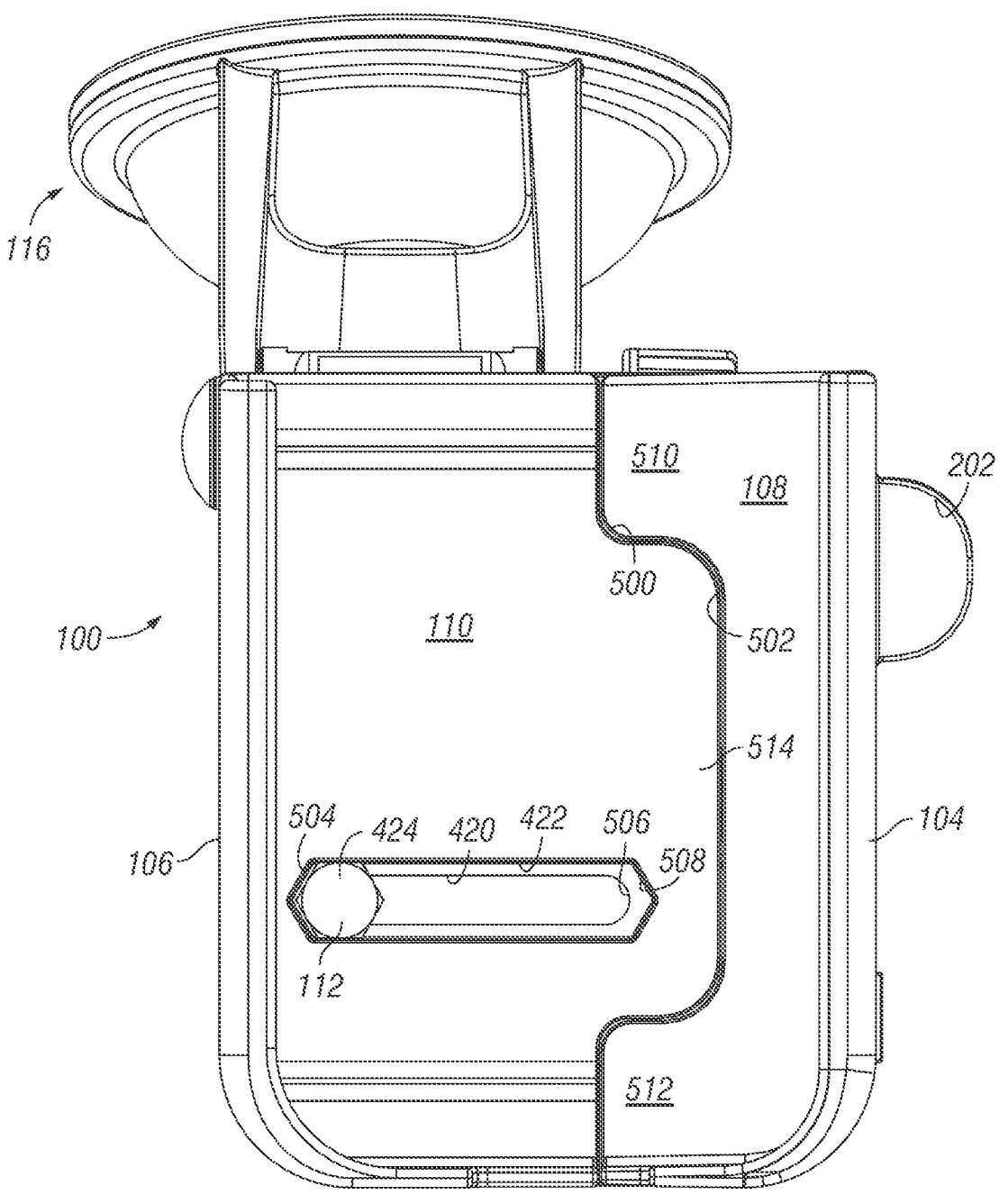
FIG. 5 is a rear view of the mount shown in FIG. 1, with first and second jaws defining a minimum width between them, and the first jaw being rotated to a closed configuration.

As seen in FIG. 5, when the mount 100 is in its narrowest-width position, a right margin 500 of support plate 110 mates with or abuts a left margin 502 of support plate 108. The edges of hex bolt head 424 abut the left end 504 of slot recess 422. Slot 420 and recess 422 extend rightwardly to respective right ends 506 and 508. In order to accommodate a longer slot 420, and therefore an enhanced range of cell phone widths capable of being mounted, the margins 500, 502 are not straight. In another embodiment, they could be. In the illustrated embodiment, margin 502 creates a first, upper interior tab 510 in the upper region of support plate 108, and a second, lower interior tab 512 in a lower region of the support plate 108. As will be further described below, it is these tabs 510, 512 which will contact the back of the cell phone to push it out of a caged condition, and it will be these tabs 510, 512 which will be pressed frontward by the back of the cell phone to induce the rotation of jaw 104 to the closed configuration. The nonstraight right margin 500 of support plate 110 creates a rightward-extending central lobe 514 that surrounds the right ends 506, 508 of respective slot 420 and recess 422.

Figure 7:
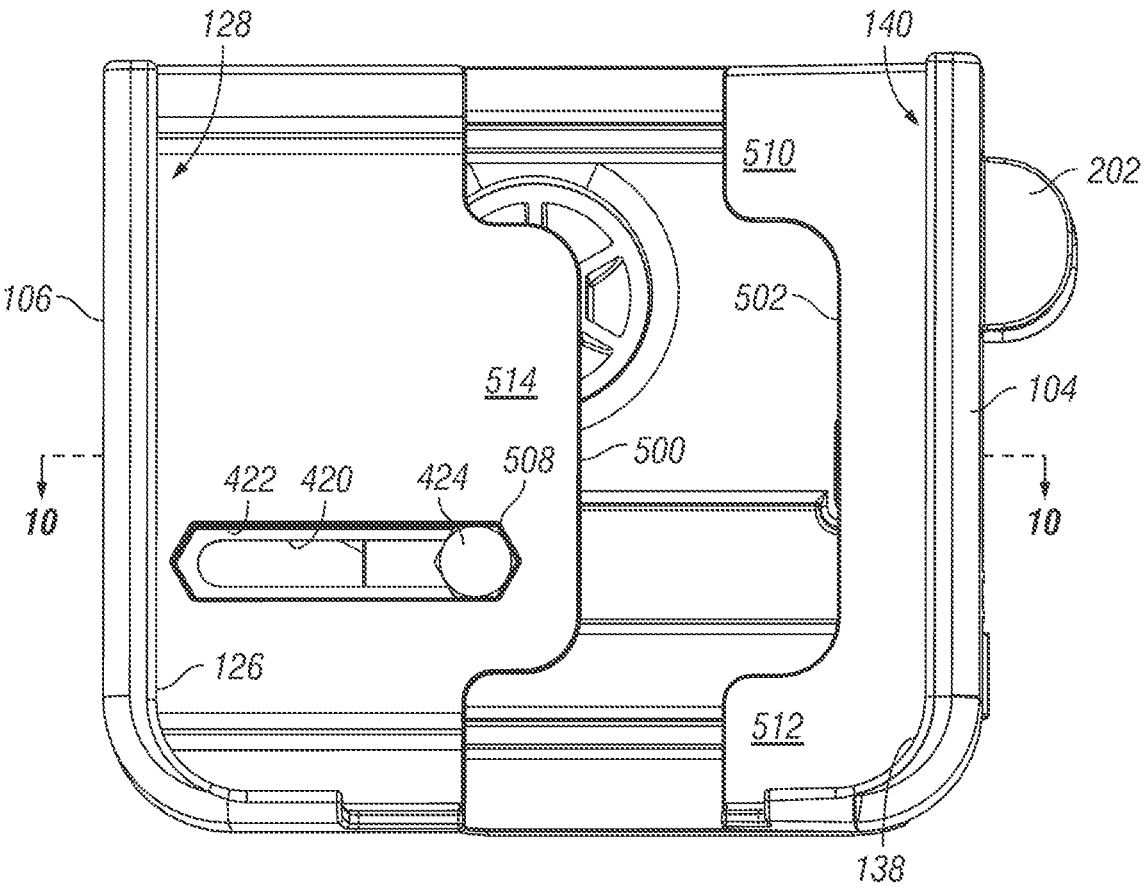
FIG. 7 is a rear view of the mount shown in FIG. 1, with first and second jaws in a maximum width position relative to each other, and the first jaw rotated to a closed configuration.

In FIG. 7, the left jaw 106 has been slid to its maximum-width position, in which the left channel 128 is farthest away from right channel 140. The edges of hex bolt head 424 abut the right end 608 of slot recess 422. In other embodiments, the maximum distance between channel 128 and channel 140 could be further increased, so as to allow the installation of the cell phone in a "landscape" configuration.

Figure 8:
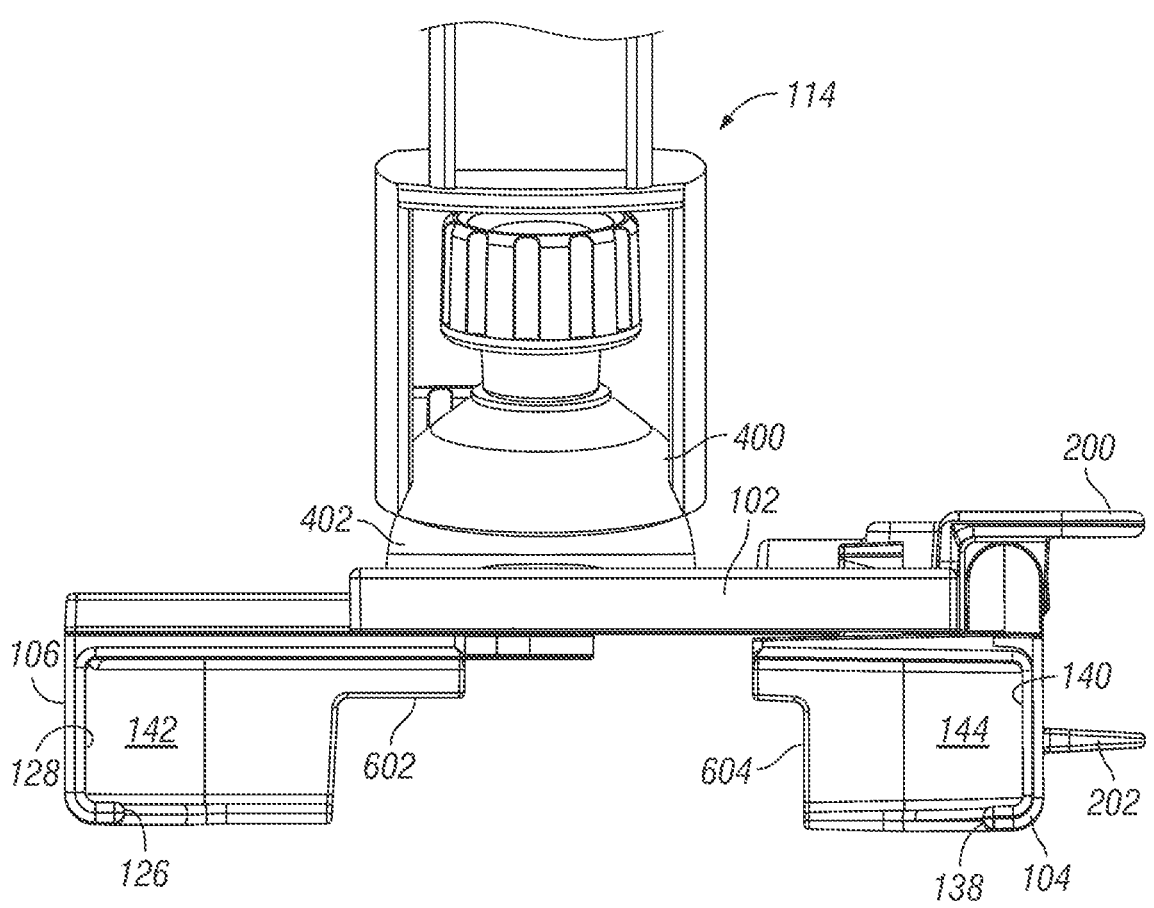
FIG. 8 is a top view of the mount as configured in FIG. 7.
Figure 9:
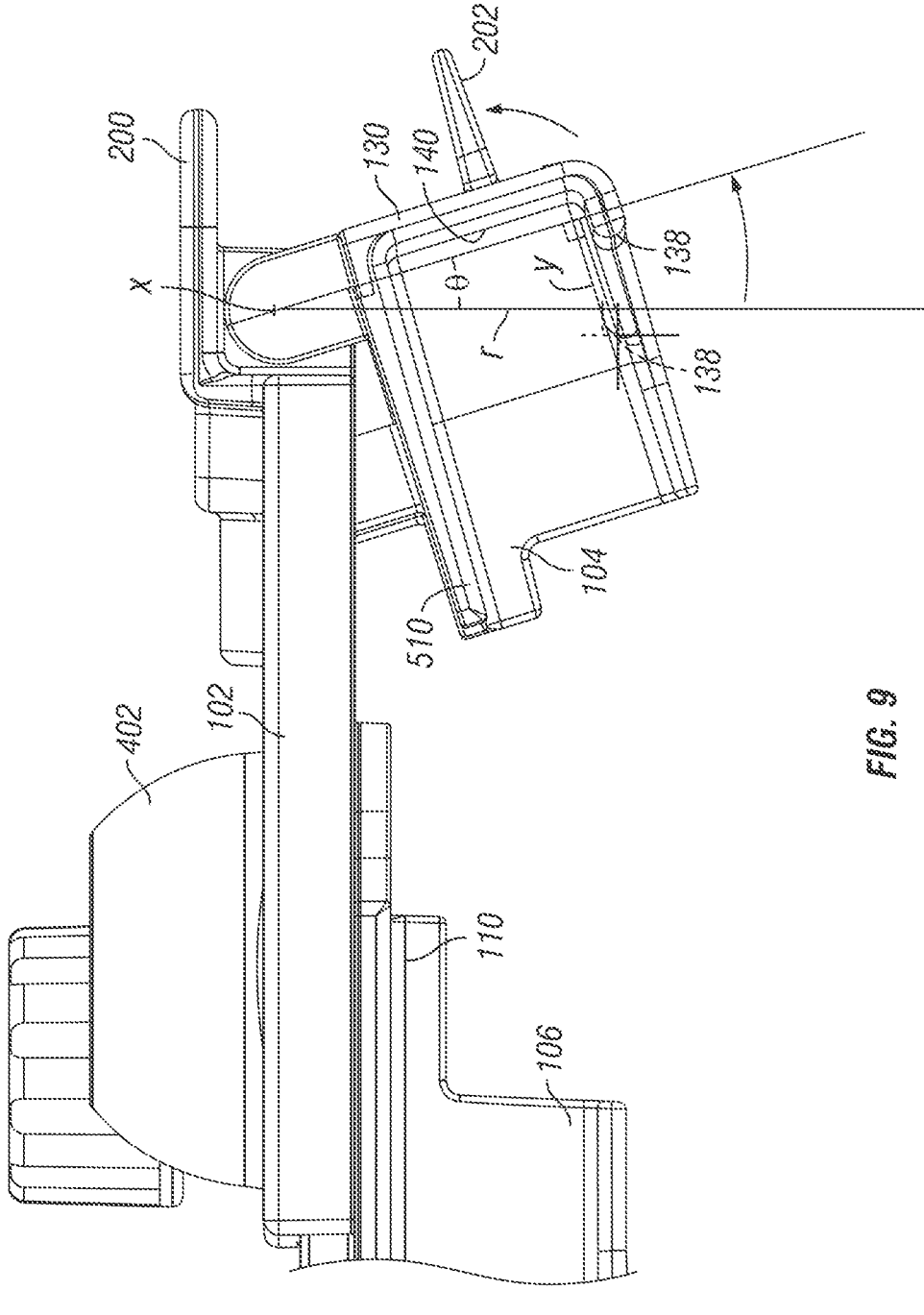
FIG. 9 is a top view detail of the mount in which first and second jaws are in a maximum width position relative to each other, and wherein the first jaw has been rotated to an open or release configuration, a portion of the first jaw in the closed configuration being drawn in dotted line.

In FIG. 9, the jaw 104 has been rotated by an angle θ from a closed configuration, in which side plate 130 is perpendicular to the first plane (occupied by second support plate 110; see FIG. 8), to an open configuration, in which lip end 138 has been swung laterally outwardly around axis X. If the radius from axis X to lip end 138 is r, and if the depth of channel 140 is defined by the distance of lip end 138 to the inner surface of side plate 130, then the sine of angle θ should be at least the ratio of the channel depth to radius r. With the proportions shown, θ should be at least about five degrees. In the illustrated embodiment, θ is about sixteen degrees.

Figure 10:
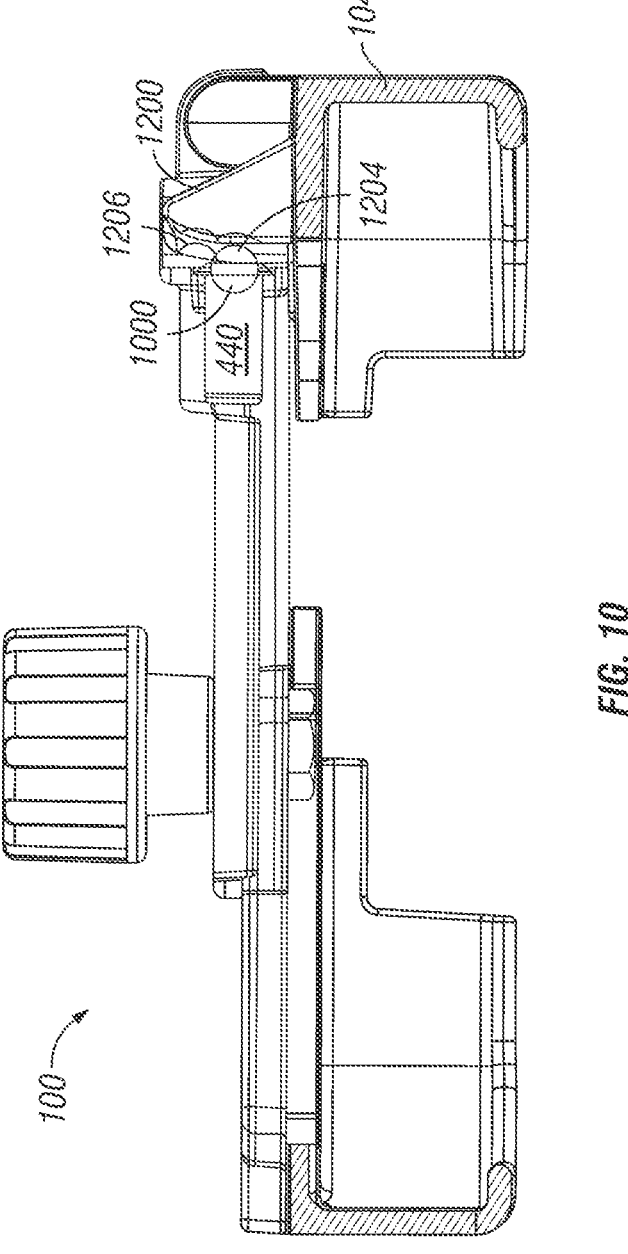
FIG. 10 is a horizontal sectional view taken substantially along Line 10-10 of FIG. 7.
Figure 11:
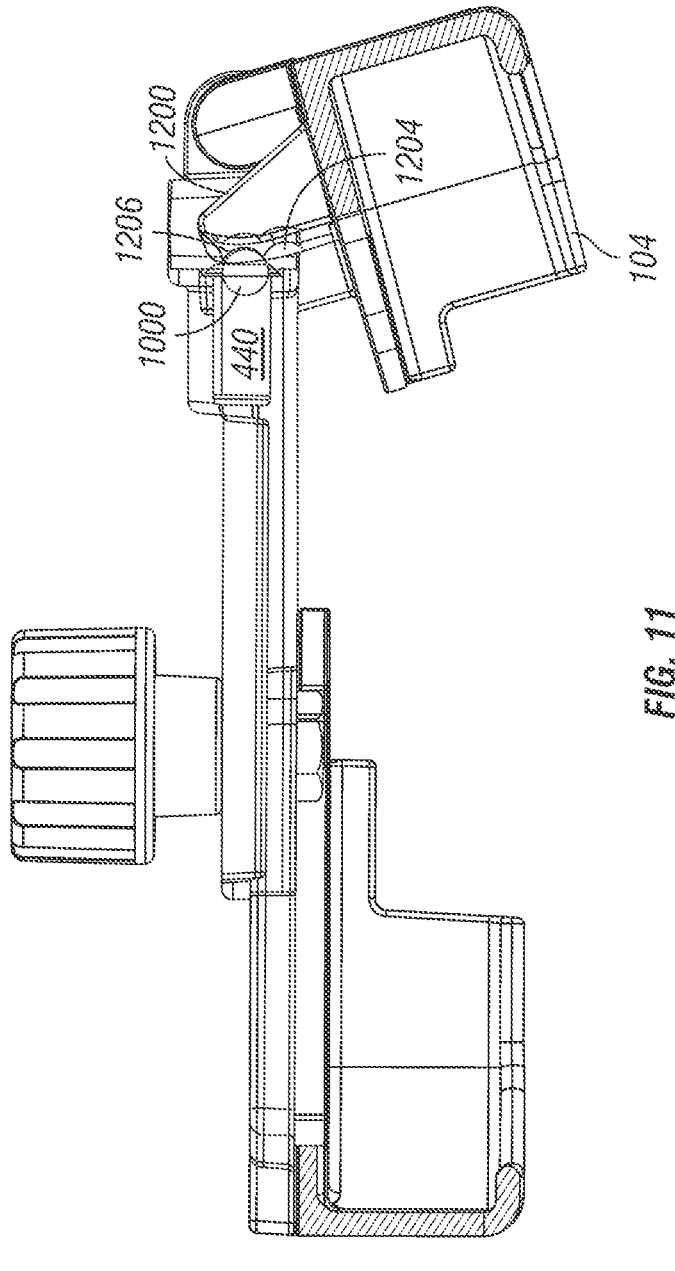
FIG. 11 is a horizontal sectional view taken on the same plane as that used for FIG. 10, but showing the first jaw as rotated to an open or release configuration.

In one embodiment, a detenting structure indexes the open and closed configurations of the jaw 104. One such detenting mechanism is shown in FIGS. 10-12. A camming member 1200 (FIG. 12) forwardly extends from a general front surface 454 of jaw 104. The camming member has an inwardly-facing convex camming surface 1202 with a first concave detenting surface 1204, and, immediately forward of or overlapping the first detenting surface 1204, a second concave detenting surface 1206. In FIG. 10, a detenting ball 1000 has been cammed into concave detenting surface 1204 by the spring 441 housed in cylinder 440 (FIG. 4). This detents jaw 104 to the closed configuration. In FIG. 11, the detenting ball 1000 has been cammed into concave detenting surface 1206 by the detenting spring 441. This detents jaw 104 to the open or release configuration. The detenting mechanism, through an audible and tactile sensation, tells the user when he or she has achieved either configuration. Further, the detenting mechanism ensures the that the chosen configuration will remain until consciously changed by the user. In an alternative embodiment (not shown), the detenting structure shown in FIGS. 10-12 could be reversed. The spring-loaded ball 1000 could be carried on the pivoting jaw 104, while a concave-shaped camming surface could be molded as a part of base 102. In other embodiments, the detenting structure could incorporate another pressuring element such as a leaf spring instead of a spring-loaded ball. The detenting structure creates a resistance to rotation of jaw 104 when the jaw 104 is at either detented position. The user must exert at least a predetermined amount of force to escape either detented position.

FIG. 12 also illustrates upper and lower retention tabs 1208, 1210 that forwardly extend from the general forward surface 454 of jaw 104. Upper retention tab 1208 has a terminal barb 1212 while lower retention tab 1210 has a terminal barb 1214. During assembly of the mount, the barb 1212 of upper retention tab 1208 is snapped forwardly through an upper retention tab hole 464 (FIG. 4A), while the barb 1214 of lower retention tab 1210 is snapped forwardly through a lower retention tab hole 466. Once the barbs 1212, 1214 have been inserted through holes 464 and 466, they will prevent easy withdrawal of tabs 1208 and 1210. The purpose of retention tabs 1208 and 1210 is to limit the degree to which jaw 104 can be swung out. Tabs 1208 and 1210 effectively prevent jaw 104 from being swung out beyond the open configuration detented position.

Figure 13:
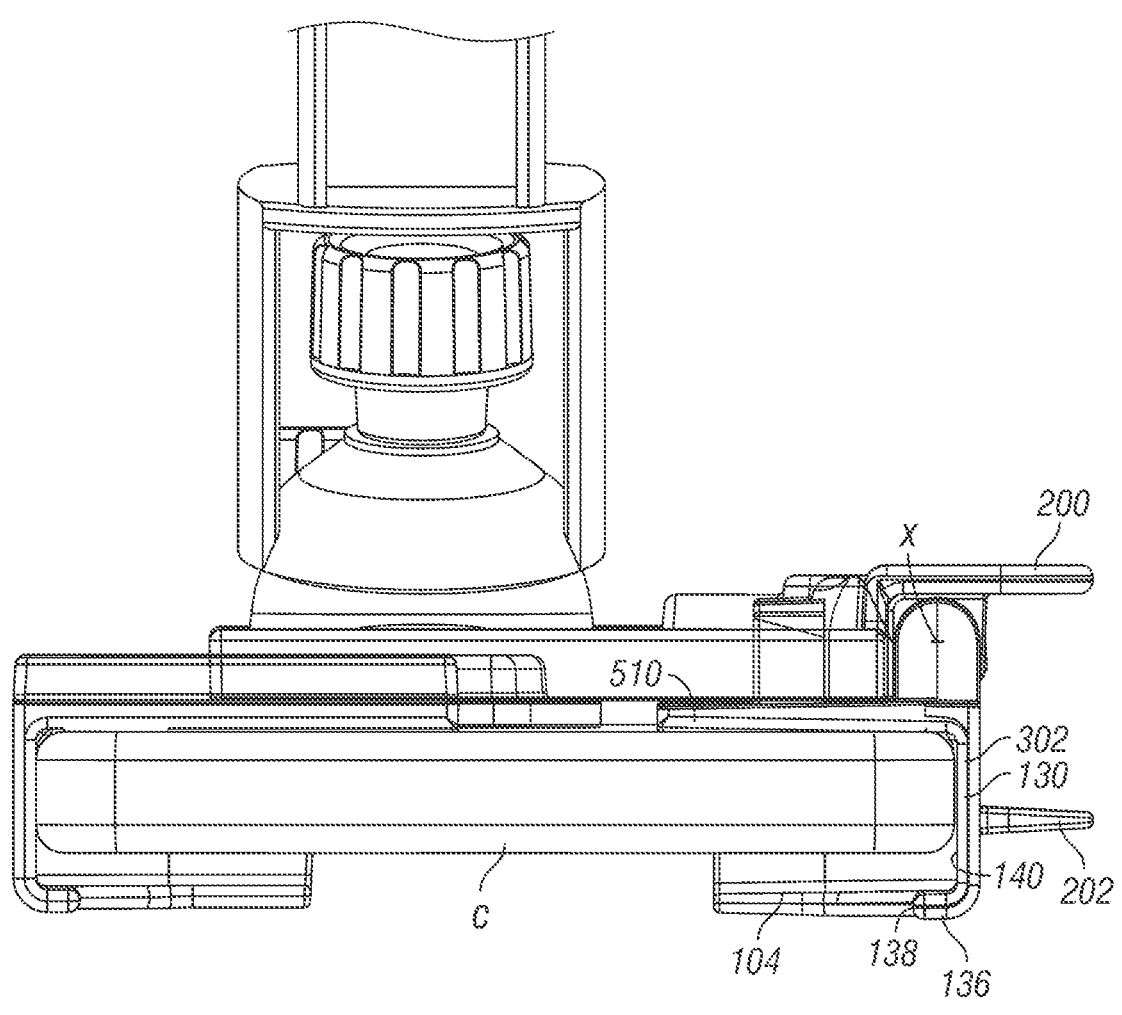
FIG. 13 is a top view detail of the mount as holding a cell phone, the first jaw having been rotated to a closed configuration.

In FIG. 13, a right lateral side 302 of cell phone C has been "caged" by channel 140, since jaw 104 is in its closed configuration. In this posture, the lip 136 will prevent the removal of cell phone C in a rearward direction (toward the bottom of the page in this FIGURE).

Figure 14:
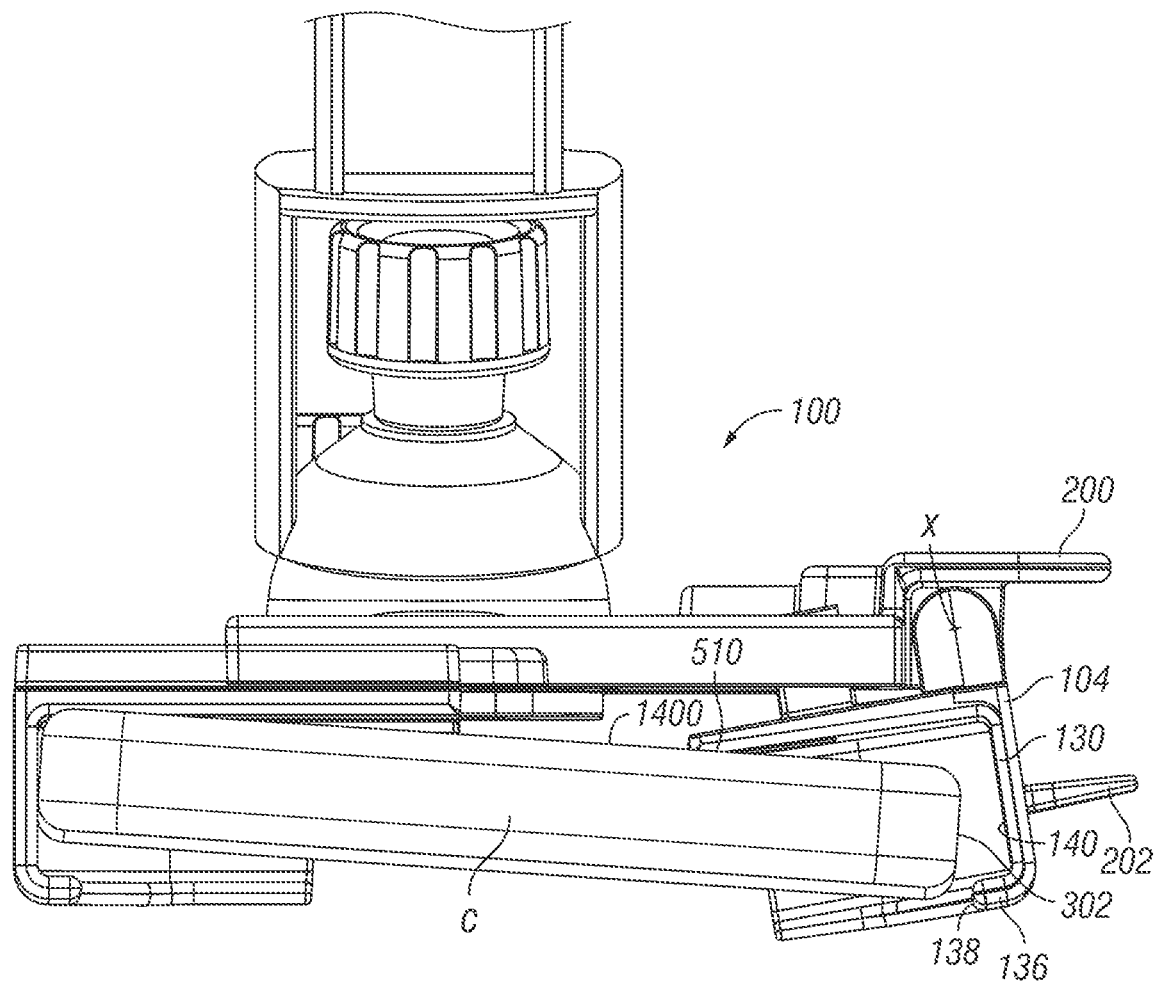
FIG. 14 is a top view detail similar to FIG. 13, but showing the first jaw as rotated to an open or release configuration.

In FIG. 14, jaw 104 is in the open or release configuration, by which lip 136 and lip end 138 have been swung out of the way. Lip 136 therefore no longer presents a barrier to the rearward extraction of cell phone C. Further, inner tab 510 (and lower tab 512, not shown in this FIGURE) are in contact with the back surface 1400 of cell phone C.

This FIGURE illustrates a cell phone C about to be extracted from mount 100, or a cell phone C about to be installed into a mount 100. In the former instance, the user has pinched tab 202 toward tab 200, causing the entirety of jaw 104 to rotate laterally outwardly. Tab 510 (and tab 512) push on the back surface 1400 to rearwardly displace the cell phone C, making cell phone C more extractable by one hand. In the latter instance, the user is about to push tab 510 (and tab 512) in a frontward direction through the back surface 1400 of cell phone C. A user is thereby able to push tabs 510, 512, thereby rotating jaw 104 out of the second detented position back to the first detented position, and swinging in lip 136 to cage the lateral right side 302 of the phone C.

FIGS. 15A-15C and FIG. 16 illustrate steps in a personal electronic device mounting process made possible by the invention. At step 1598, the user loosens the jaw-clamping knob 430 and opens the jaws by sliding jaw 110 leftward to its widest position. At step 1600, the user uses inner tabs 510, 512 to rotate jaw 104 to the closed configuration, either by pressing them with his or her fingers or using the back surface 1400 of the cell phone. This last method will automatically cause the phone to be inserted at 1602. Otherwise, the user vertically drops the phone into the jaws 104, 106 at this step. See FIG. 15A.

At step 1604, the user slides jaw 106 toward or away from jaw 104, thereby adjusting or "sizing" the width between jaws 104 and 106 to the width of the cell phone. At step 1606, the user pinches the external tabs 200, 202 to rotate jaw 104 to the open configuration, and removes the phone (1608). See FIG. 15B. Alternatively, the user simply vertically lifts the phone out of the jaws.

Now that the mount 100 is again empty, at step 1610 the user affixes the mount 100 to a surface, such as the interior surface of a windshield. This can be done by actuating the suction cup assembly 114. If an articulated arm assembly such as the one shown in FIGS. 18-20 is used, the user may also adjust the angle of the arm assembly 114 relative to the axis of the suction cup assembly 116.

Preliminary to step 1612, the mount 100 must be in the open configuration and empty. In this condition, the user displaces the cell phone in a forward direction, until tabs 510 and 512 are contacted. When contact with the cell phone back surface 1400 is made (FIG. 14), further pushing by the user will cause (1614) the right jaw 104 to rotate closed (FIG. 13). The pushing force exerted by the user must be at least a predetermined force for overcoming the resistance created by the detent structure. Responsive to this, the mount 100 is now in a closed configuration, and securely holds the phone. If an adjustment of the cell phone viewing plane is necessary, this is done at step 1616, following which the viewing plane is set by tightening knob 418.

Figure 15A:
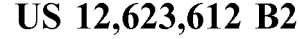
FIG. 15A is a view of initial steps of installing a cell phone in the mount, the initial steps including sizing the mount for a particular cell phone.
Figure 15B:
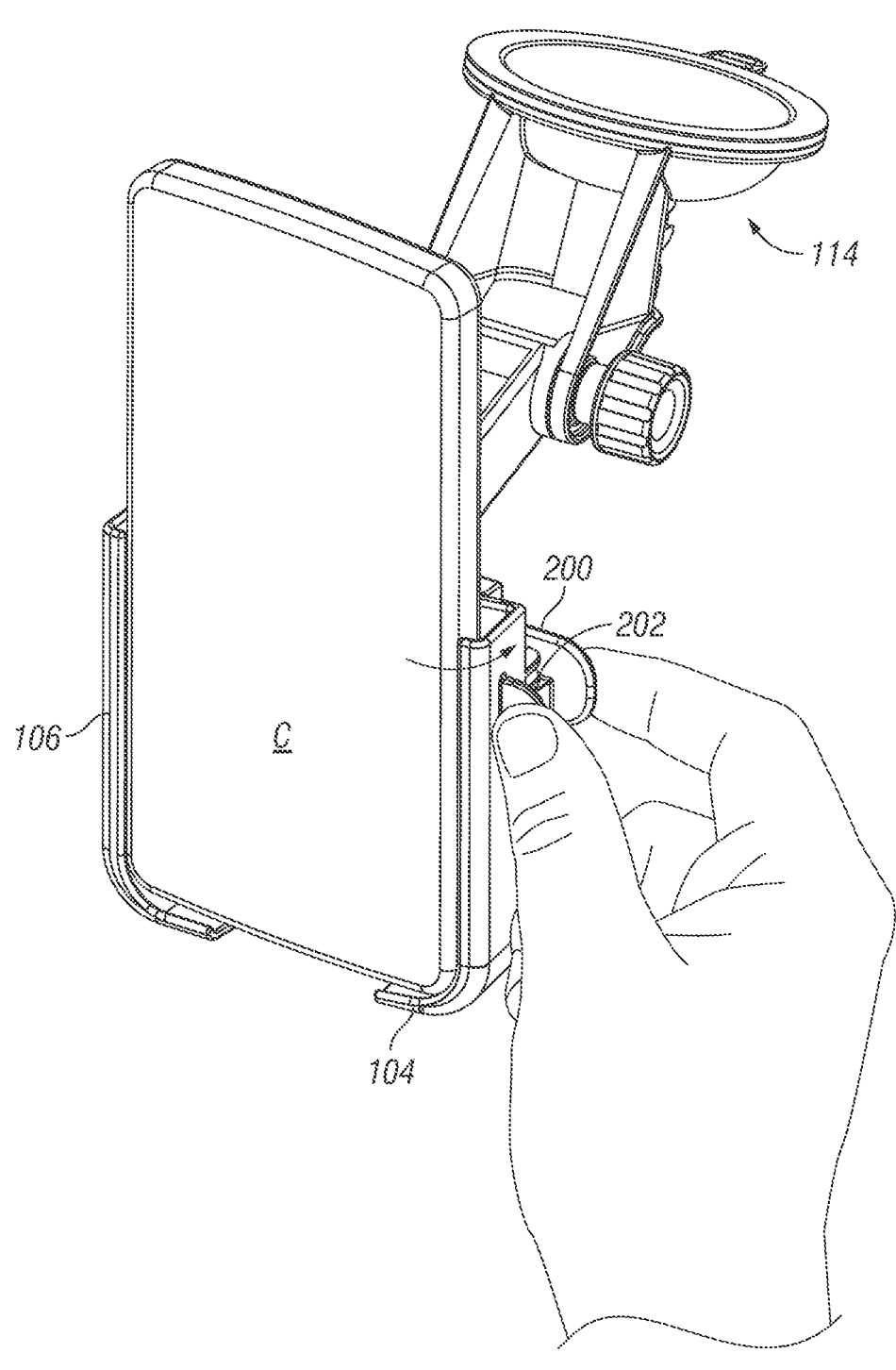
FIG. 15B is a view of a step of removing the cell phone from the mount after the jaws have been sized to the cell phone width, and also is a view of a step of removing the cell phone from the mount after the mount has been affixed to the windshield.
Figure 15C:
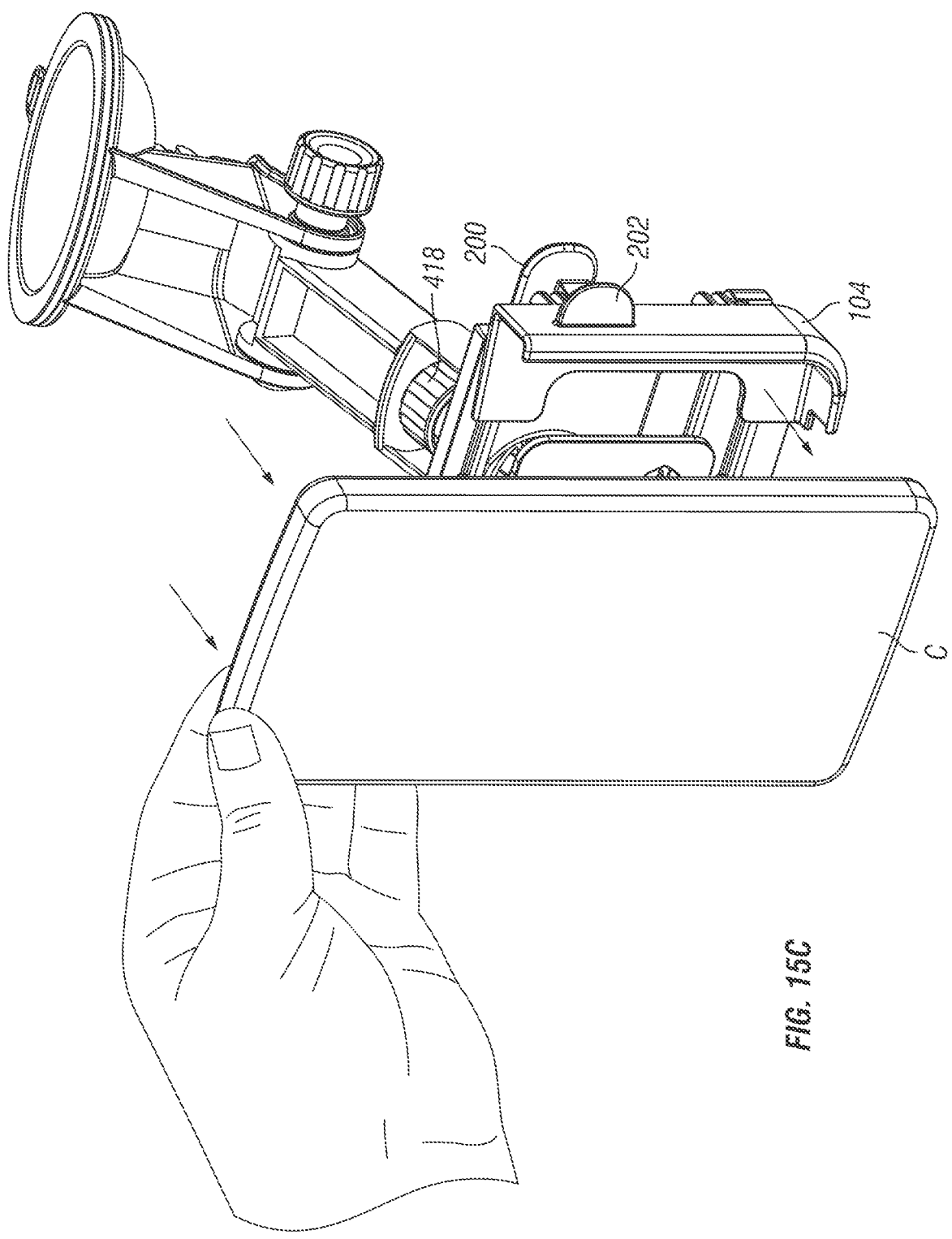
FIG. 15C is a view of a step of removing a cell phone from the mount with one hand.

The mounted phone is now ready for use. When the user wishes to remove the phone from the mount, at step 1700 (FIGS. 15B and 17) the user pinches external finger tab 202 toward finger tab 200, which may be accomplished with one hand. Responsive to this force, the jaw 104 leaves the detented closed configuration and rotates to the open configuration at step 1702. This uncages the right side of the phone at step 1704. The user may then remove the cell phone with one hand at step 1706 (FIG. 15C). FIG. 15C shows this step being accomplished by the left hand, but it could as or more easily be accomplished with the right hand.

Now that the mount has been step up and affixed to the windshield, the user need only perform step 1612 to reinstall the phone into the mount, as the width between channel jaws has already been customized to the width of the phone.

In summary, a personal electronic device mount has been shown and described that is particularly useful for mounting the device to the slanting interior surface of a vehicle windshield. To install the phone into the mount, the user simply pushes the phone, in a forward direction, into the mount's jaws, which will close to a closed configuration in response. To extract the phone from the mount, the user pinches together two external finger tabs, and then extracts the phone in a rearward direction. Both of these actions may be accomplished with one hand.

While embodiments of the present invention have been described in the above detailed description and illustrated in the appended drawings, the present invention is not limited thereto but only by the scope and spirit of the appended claims.

I claim:

1. A mount for a personal electronic device, the mount configurable to assume an open configuration in which the device may be removed from the mount in a predetermined first direction, and further configurable to assume a closed configuration in which the device may not be removed from the mount in the first direction, the mount comprising:

a base, a first finger tab affixed to and laterally outwardly extending from the base; and a holding element hinged to the base, a second finger tab outwardly extending from the holding element, the second finger tab spaced from the first finger tab by a first distance when the mount is in the closed configuration, the second finger tab positioned to be closer than the first distance to the first finger tab when the mount is in the open configuration, such that a user may pinch the second finger tab toward the first finger tab in order to reconfigure the mount from the closed configuration to the open configuration; wherein the holding element is comprised of a first jaw having a first support plate for supporting a back surface of the personal electronic device, a first channel side plate rearwardly extending from the first support plate and a lip rearwardly spaced from the first support plate and inwardly extending from the first channel side plate, the second finger tab extending laterally outwardly from the first channel side plate, wherein in the closed configuration the first support plate, the first channel side plate and the lip are disposed to cage a lateral side of the personal electronic device.

2. The mount of claim 1, wherein the base is substantially aligned with a base plane, the first finger tab disposed in a plane parallel to the base plane.

3. The mount of claim 1, wherein the base is substantially aligned with a base plane, the second finger tab occupying a plane substantially parallel to the base plane when the mount is in the closed configuration, the second finger tab occupying a plane at an angle to the base plane when the mount is in the open configuration.

4. The mount of claim 1, wherein the second finger tab is disposed to be rearward of the first finger tab.

5. A mount for a personal electronic device, the mount configurable to assume an open configuration in which the device may be removed from the mount in a predetermined first direction, and further configurable to assume a closed configuration in which the device may not be removed from the mount in the first direction, the mount comprising:

a base;

a first support plate hinged to the base at an axis and operable to support the device, a tab of the first support plate extending at an angle to the axis, the first support plate substantially occupying a first plane when the mount is in the closed configuration, the first support plate substantially occupying a second plane disposed at an angle to the first plane when the mount is an open configuration, the tab operable to contact a back surface of the device, a predetermined force exerted by a user through the back surface of the device on the tab in a third direction opposite from the first direction causing the first support plate to pivot from the second plane to the first plane, thereby causing the mount to be reconfigured from the open configuration to the closed configuration.

6. The mount of claim 5, further comprising a second support plate having an inner margin, the second support plate substantially aligned with the first plane, the second support plate having a laterally extending slot, a fastener extending in the first direction from the base and into the slot of the second support plate such that the second support plate is slidably affixed to the base, the second support plate being laterally slidable from a narrowest position in which the second support plate is closest to the first support plate to a widest position in which the second support plate is farthest away from the first support plate, the tab of the first support plate abutting a inner margin of the second support plate when the mount is in a first configuration and when the second support plate is in the narrowest position.

7. The mount of claim 6, wherein the inner margin of the second support plate has a first portion which is operable to abut the tab of the first support plate, and a second portion surrounding the slot, the slot laterally inwardly extending beyond a lateral position of the first portion.

8. The mount of claim 5, wherein the first support plate is operable to be moved from the first plane to the second plane and vice versa, and wherein the first support plate is detented in each of the first and second planes.

9. The mount of claim 8, wherein the first support plate is part of a first jaw, one of the first jaw and the base having mounted thereon a spring-loaded detenting ball, and wherein an other of the first jaw and the base has a detenting surface with first and second depressions, the ball camming into the first depression to index the first support plate to the first plane, the ball camming into the second depression to index the first support plate to the second plane.

10. The mount of claim 9, wherein the spring-loaded detenting ball is mounted on the base.

11. The mount of claim 10, wherein the detenting surface is located on the first jaw, the detenting surface extending in the third direction from the first support plate.

12. The mount of claim 5, wherein the tab of the first support plate is a first tab, the first support plate further having a second tab spaced from the first tab, the predetermined force exerted by the user through the back of the device transmitted through both the first and second tabs to thereby pivot the first support plate from the second plane to the first plane.

13. A method for mounting a personal electronic device to a surface, the method comprising the steps of:

providing a mount for a personal electronic device that has a closed configuration in which the device may not be removed from the mount in a predetermined first direction away from the surface, and an open configuration in which the device may be removed from the mount in the first direction, the mount further having a base and an attachment arm with a first end fastened to the base and a second end remote from the first end for fastening to the surface;

either receiving the mount as preconfigured into the closed configuration, or configuring the mount to the closed configuration;

placing the device on a first support plate of the mount and on a second support plate of the mount;

sliding the second support plate in a first plane relative to the base, so that a channel rearwardly extending from the second support plate cages a second lateral side of the device and so that a channel rearwardly extending from the first support plate cages a first lateral side of the device spaced from the second lateral side;

removing the device from the mount;

affixing the second end of the attachment arm to the surface;

pivoting the first support plate relative to the base such that the first support plate substantially is aligned to a second plane that is tilted relative to the first plane;

moving the device in a third direction opposite the first direction until a back surface of the device contacts the first support plate;

further moving the device in the third direction after the back of the device contacts the first support plate, thereby pivoting the first support plate back from the second plane to the first plane; and responsive to said step of further moving, caging the first lateral side of the device within the first channel, to thereby hold the electronic device in the mount and prohibit the device's removal from the mount in the first direction.

14. The method of claim 13, further comprising the steps of indexing the first plane with a detent; and indexing the second plane with a detent.

15. The method of claim 13, wherein the steps of moving and further moving are performed by one hand of a user.

16. A method of removing a personal electronic device from a mount which has been affixed to a surface, the method comprising the steps of:

providing a mount in which a back surface of the personal electronic device is supported by a first support plate and by a second support plate initially disposed to be coplanar with the first support plate in a first plane, the first and second support plates joined to a base of the mount, the first support plate forming part of a channel for caging a first lateral side of the personal electronic device, the channel further comprised of a side plate rearwardly extending from an end of the first support plate to an end of the side plate and a lip extending from the end of the side plate to an inner lip end;

mounting the device to the surface using the mount;

pinching a first finger tab which extends laterally outwardly relative to the first support plate towards a second finger tab which extends laterally outwardly from the base;

responsive to the step of pinching, rotating the first support plate from the first plane to a second plane disposed at an angle to the first plane;

responsive to the step of rotating, uncaging the first lateral side of the device from the channel, to thereby permit the device's removal in a first direction orthogonal to the first plane; and removing the device from the mount in the first direction.

17. The method of claim 16, wherein the surface is a rearwardly and upwardly tilting surface of a vehicle windshield, and wherein, after the device is installed in the mount, the windshield obstructs removal of the device from the mount in a second direction coplanar with the first plane.

18. The method of claim 16, wherein said step of pinching is done by the fingers of one hand.

19. The method of claim 16, wherein, when the lateral side of the device is caged by the channel, the first support plate is detented to a closed configuration, the step of rotating the first support plate from the first plane to the second plane including the step of detenting the first support plate to the second plane to thereby assume an open configuration.

* * * * *